Figure 19:
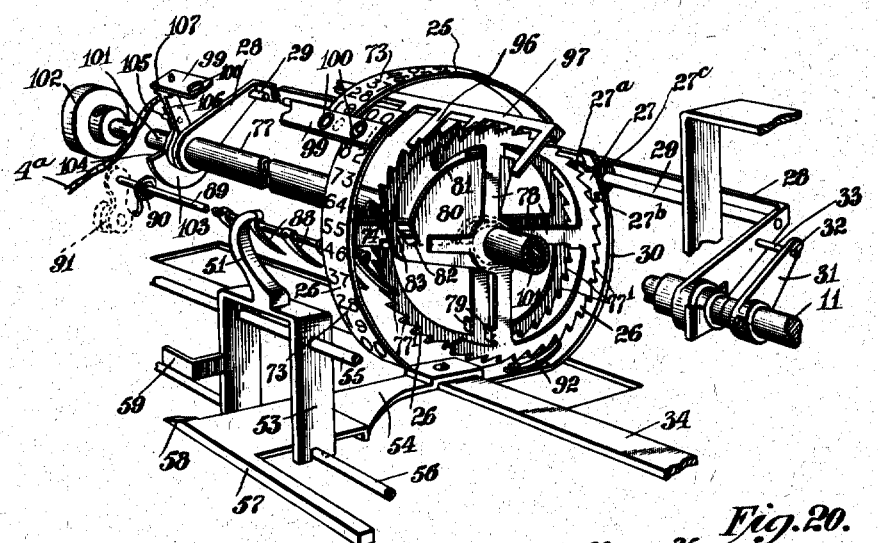

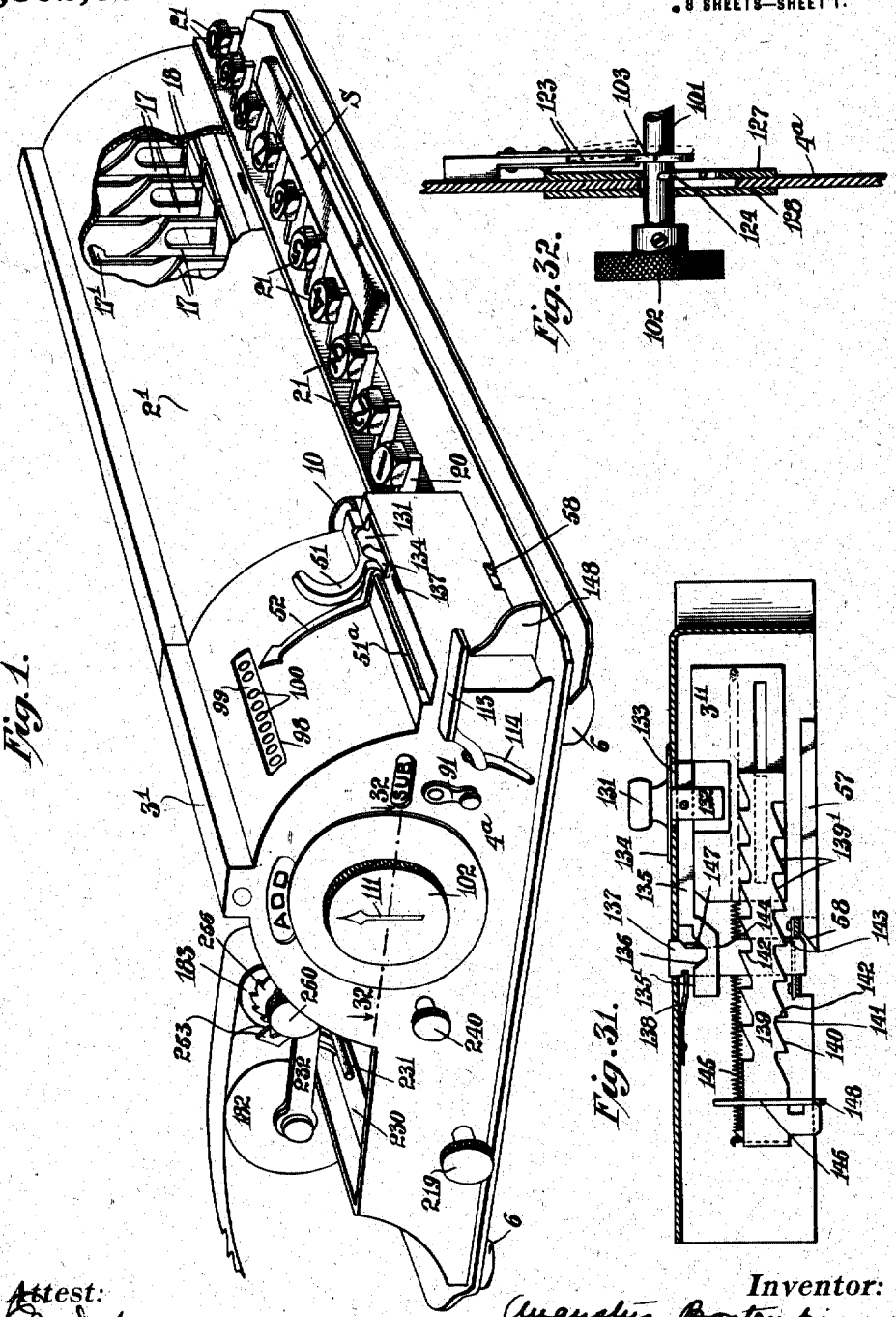

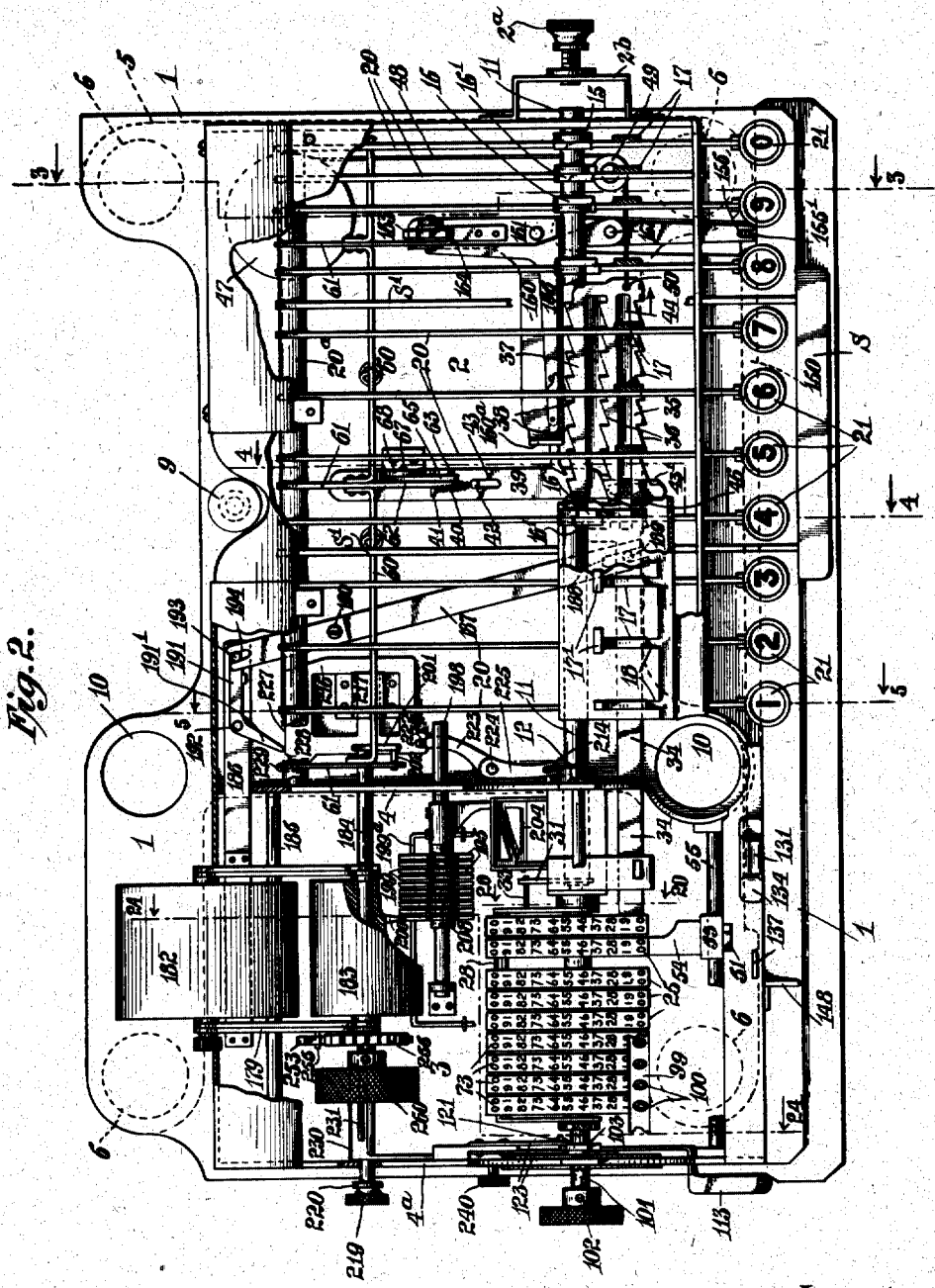

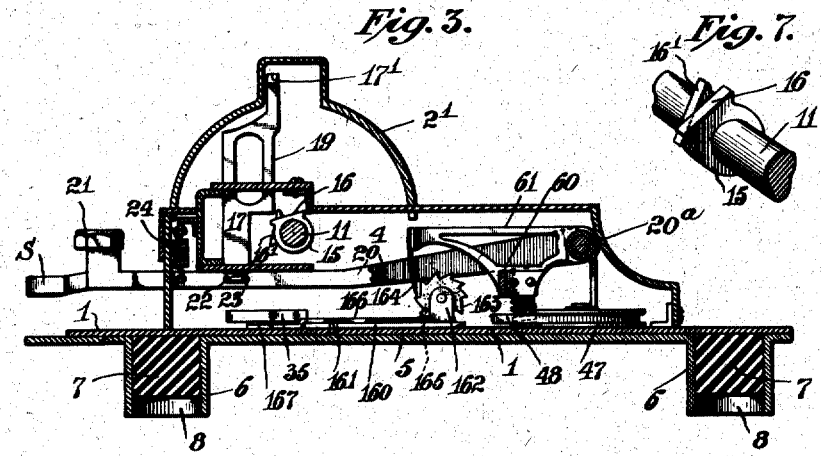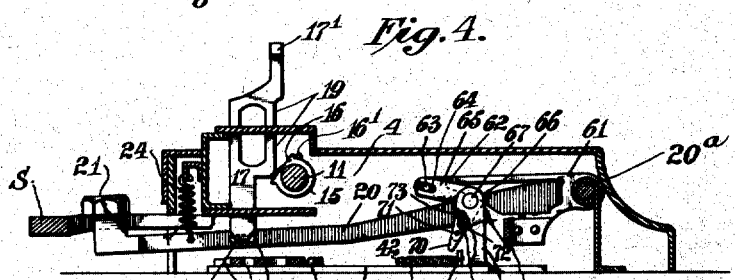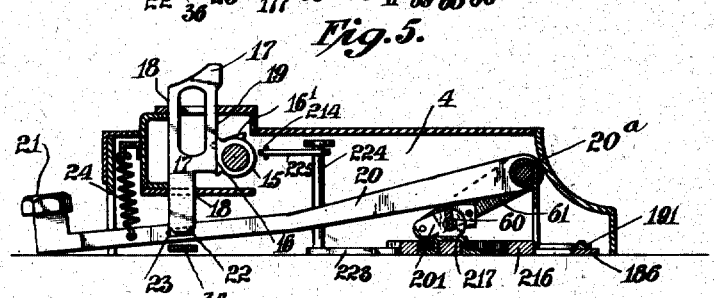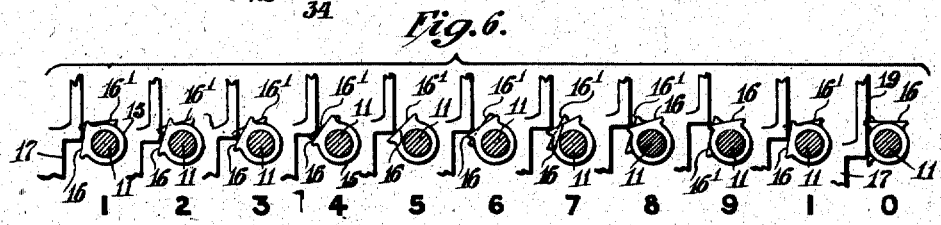

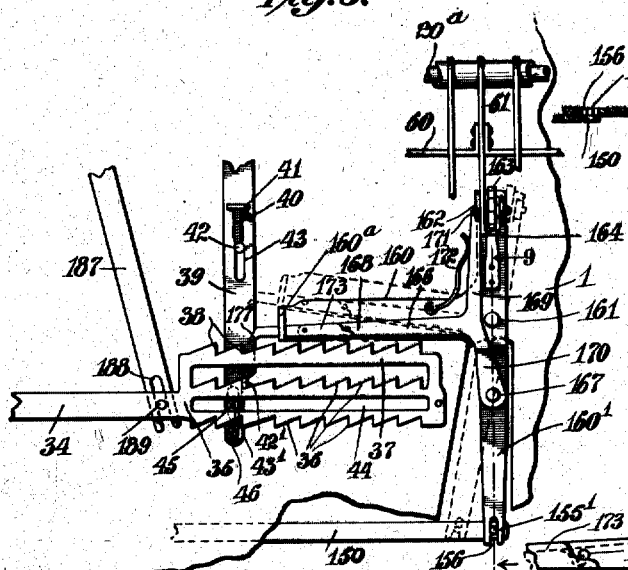

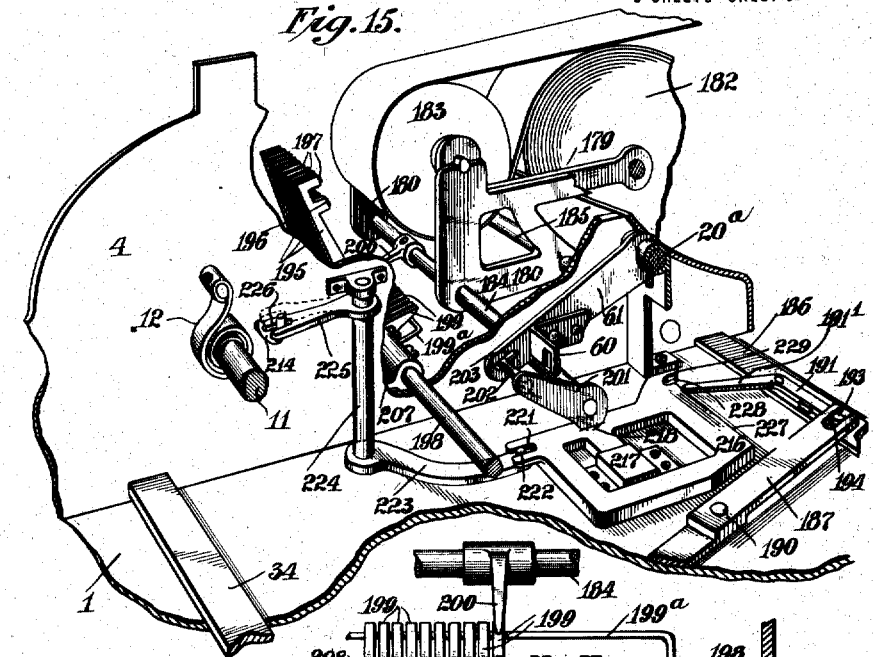

A. BONTEMPI.
CALCULATING MACHINE.
APPLICATION FILED MAR. 11, 1914. RENEWED FEB. 7, 1916.

1,302,501.

Patented May 6, 1919.
8 SHEETS—SHEET 6.

Attest:
C. B. Mitchell
M. A. Johnson

Augustus Bontempi
Inventor:
by Dyke & Canfield
Attys

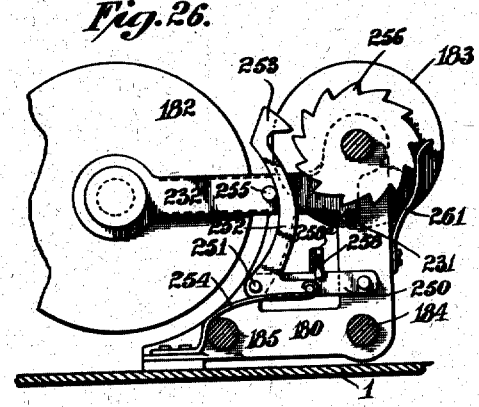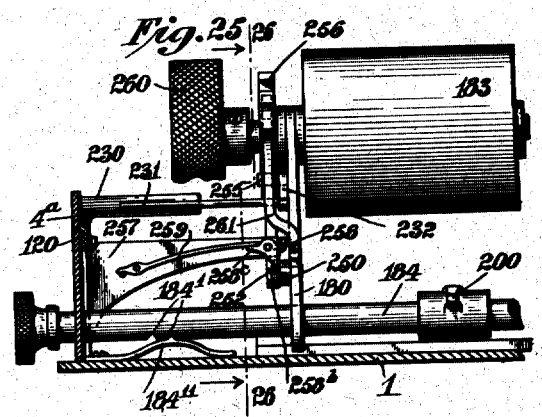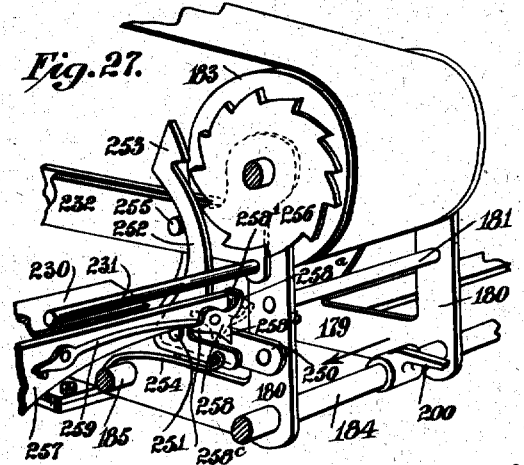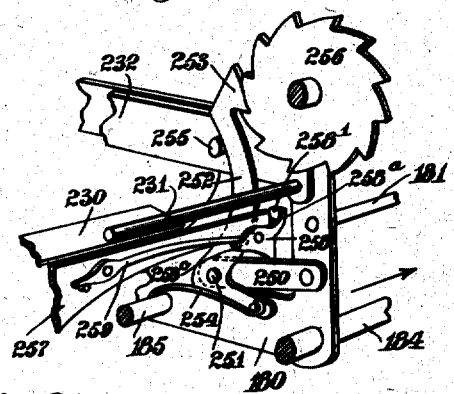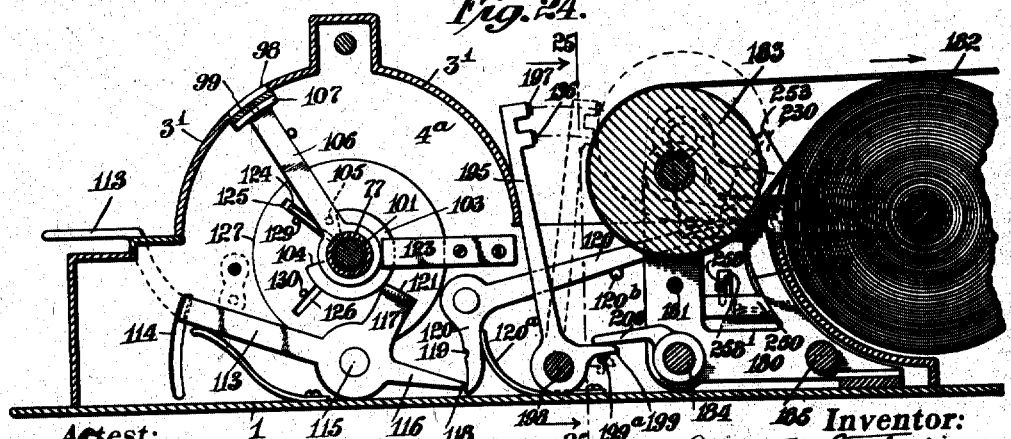

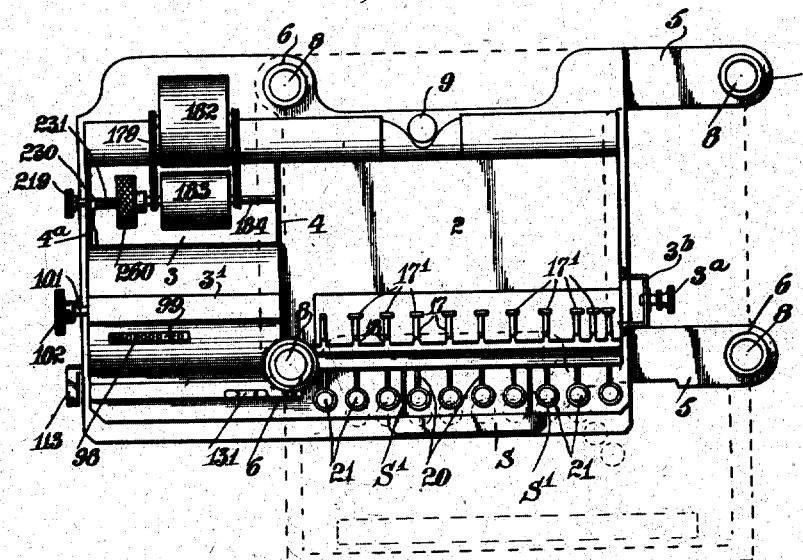

UNITED STATES PATENT OFFICE.

AUGUSTUS BONTEMPI, OF COYTESVILLE, NEW JERSEY, ASSIGNOR TO THE BONTEMPI ARITHMO CORPORATION, OF NEW YORK, N. Y., A CORPORATION OF NEW YORK.

CALCULATING-MACHINE.

1,302,501. Specification of Letters Patent. Patented May 6, 1919.

Application filed March 11, 1914, Serial No. 823,866. Renewed February 7, 1916. Serial No. 76,796.

*To all whom it may concern:*

Be it known that I, AUGUSTUS BONTEMPI, a subject of the King of Italy, and a resident of Coytesville, county of Bergen, and State of New Jersey, have invented certain new and useful Improvements in Calculating-Machines, of which the following is a specification.

My invention relates to machines for making mechanical calculations, and especially for the purpose of performing mechanically the operations of addition, subtraction and multiplication. Among the objects of the present invention are the improvement of devices of this character in numerous important features, affording a machine for such purpose which can be constructed readily and cheaply, with a small number of parts, and which will be substantial and not readily put out of order, and which can readily and conveniently be set to perform the various operations, and is constructed in such a manner that such operations may be performed without the necessity of undue attention or mental strain on the part of the operator and which may be used alone as a complete mechanism or in connection with a typewriting machine.

Another object of the invention consists in the provision of a machine of this character of which the actuating mechanism is contained in a flat, low-down compartment, so that a typewriting machine may be placed thereon to be used in connection therewith and not be raised to an undue height.

Another object of the invention consists in the provision of a supporting means, which in one position will serve as a support for the calculating machine, and in another position may serve such purpose and also serve to support a typewriting machine and insure operative registration thereof with the calculating machine, the typewriting machine being placed thereon and used in connection therewith, and without the necessity of resorting to the use of fastening means for securing the typewriting machine in place thereon.

Another object of the invention consists in the arrangement of the actuating mechanism in such manner as that it may be operated from keys with which the calculating machine is permanently provided, or from the keys of a typewriting machine placed thereon, at will.

Another object of the invention consists in the provision of an improved escapement which contains numerous advantageous features, among others, being that it is adapted to be received in the flat, lowdown space available; the arrangement of the structure in such manner that the calculating mechanism may be put out of operation at will, and the number keys of a typewriting machine placed thereon be used without causing the operation of the calculating mechanism.

Another object of the invention consists in the provision of actuating means including rotary elements having right-line tangential facets with which sliding elements may coöperate to secure specified degrees of rotation and to leave the sliding elements free for further movement to effect additional results, the inertia of the rotating elements being overcome and the rotating elements held in place by the sliding elements during the further movement of the latter.

Another object of the invention consists in the providing of such rotary elements with complemental facets so that slight bodily movement will bring one or the other opposite the slidable elements.

Another object of the invention consists in the provision of a calculating machine in which the operation of subtraction may be carried out by a slight change in the disposition of the parts and without the operator being confused during the subtraction.

Another object of the invention consists in the provision of an apparatus in which the number wheels are continuously advanced in the same direction while the machine is being used for its various purposes of effecting the operations of addition, subtraction and multiplication.

Another object of the invention consists in the provision of visible numeral carrying sectors which, after movement in one direction under the action of the number wheels are automatically shifted backward to reëngage the number wheels for further movement under the actuation thereof.

Another object of the invention consists in the provision of shiftable connections between the number wheels and sectors and of means for controlling such connections interposed between the number wheels and sectors and movable under the control of an operator to vary the position for shifting the connections controlled thereby.

Another object of the invention consists in the arrangement of such controlling means to also control the carrying from one number wheel to another.

Another object of the invention consists in the provision of means for modifying the action of the escapement in a way to make it possible to carry out the steps in the operation of multiplication, which operation is carried out by a novel modification of the ordinary process of multiplication which dispenses with the mental step of "carrying" in computing partial products.

Another object of the invention consists in the provision of a machine in which the escapement may be returned upon setting to a column one lower than upon its previous return so as to adapt the machine for use in the operation of multiplication.

Another object of the invention consists in the provision of a single controlling means for effecting both of the changes required in adapting the mechanism for use in multiplication.

Another object of the invention consists in the provision of an improved printing mechanism and an improved arrangement for operatively connecting the computing and printing mechanisms and putting the printing mechanism out of use when its use is not required.

The invention further consists in various other features of improvement which will appear in connection with the further description and be pointed out in my claims.

With the foregoing and related objects in view, my invention consists in the parts, improvements and combinations herein set forth and claimed, and it is to be understood that while I have illustrated and shall specifically describe one embodiment thereof, nevertheless the form of construction illustrated and described is for the purposes of illustration and for affording a clear understanding of my invention only, and that numerous departures from the specific form shown and various changes therein may be resorted to without departing from my invention or sacrificing any of the advantages thereof.

Figure 21:
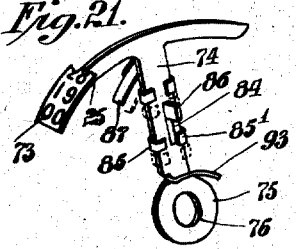
Figure 20:
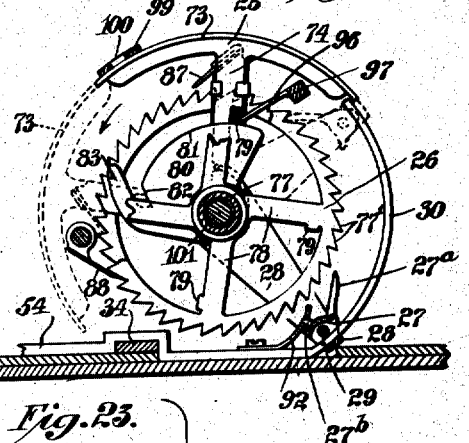
Figure 22:
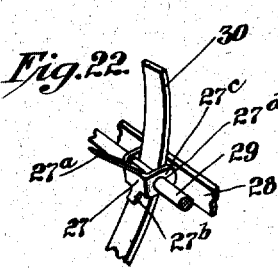
Figure 23:
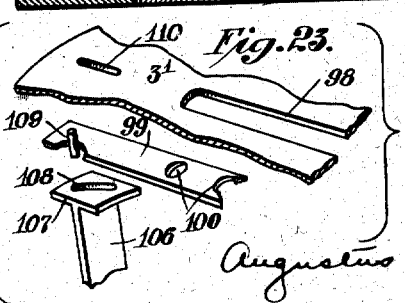

Referring now to the accompanying drawing forming a part of this specification and wherein the same reference characters are uniformly made use of to designate the same parts, Figure 1 is a perspective view of one form of machine embodying my invention, arranged for use as a self-contained calculating machine, part of the actuating mechanism cover being broken away to show the interior construction. Fig. 2 is a plan view of the machine shown in Fig. 1, but with the cover plates removed and certain parts broken away for clearness of illustration. Fig. 3 is a cross-sectional view taken on the line 3—3, Fig. 2, looking in the direction of the arrows and showing the cover plate in cross-section, and also showing a key and key lever in normal elevated position. Fig. 4 is a cross-sectional view taken on the broken line 4—4, Fig. 2, looking in the direction of the arrows and showing a key partly depressed, the cover plate being omitted in this view. Fig. 5 is a cross-sectional view taken on the line 5—5, Fig. 2, looking in the direction of the arrows and showing a key fully depressed, the cover plate being omitted in this view. Fig. 6 is a diagrammatic view showing the relation between the key controlled strikers and the master shaft of the machine. Fig. 7 is a view in perspective of a portion of the master shaft of the machine with a ring thereon bearing a pair of facets which coöperate with the key controlled strikers, shown diagrammatically in Fig. 6. Fig. 8 is a plan view of a fragment of a machine embodying my invention, including the main escapement and a secondary escapement, which secondary escapement is made use of in the operation of multiplication. Fig. 9 is a view on line 9—9, Fig. 8, and looking in the direction of the arrows. Fig. 10 is a fragmentary perspective view showing in perspective the parts which appear in Fig. 8. Fig. 11 is an enlarged plan view of a lever shown in Fig. 8, and showing the adjusted position thereof in dotted lines. Figs. 12, 13 and 14 are views, partly in cross section, and showing three positions of the controlling mechanism used in the operation of multiplication. Fig. 15 is a fragmentary perspective view of the printing mechanism and the parts for the operation and control thereof. Fig. 16 is a fragmentary perspective view showing the mechanism for imparting longitudinal movement to the keys of the printing mechanism. Fig. 17 is a horizontal sectional view taken on the line 17—17 of Fig. 16, looking in the direction of the arrows, and also showing a part of the printing mechanism and its operating means. Fig. 18 is a fragmentary perspective view showing the part of an end wall of the machine and illustrating the operation of certain control elements. Fig. 19 is a fragmentary perspective view of the calculating mechanism proper, and showing two of the elements thereof and their relation to one another, the remaining elements being omitted for the sake of clearness. Fig. 20 is an endwise view of the parts shown in Fig. 19, certain of the parts being shown in section, the location from which this view is taken and the direction being indicated generally by the line 20—20, Fig. 2, and the arrows on said figure. Fig. 21 is a detail perspective view, with parts broken away, of a numeral carrying sector and of the cam operated interconnecting mechanism arranged to slide on the arm of such sector. Fig. 22 is a detail perspective view of the number wheel operating pawl and its actuating arm. Fig. 23 is a fragmentary detail perspective view showing the operation of the parts by which the slidable window in the cover over the numeral sectors, is actuated. Fig. 24 is a cross-sectional view taken on the broken line 24—24 in Fig. 2, looking in the direction of the arrows, and showing certain details of the controlling mechanism, and the printing apparatus in cross section. Fig. 25 is a cross-sectional view taken on the line 25—25 in Fig. 24. Fig. 26 is a cross-sectional view taken on the line 26—26, Fig. 25. Fig. 27 is a fragmentary perspective view showing the mechanism for feeding the paper of the printing mechanism. Fig. 28 is a view similar to Fig. 27, with some of the parts omitted and showing a different position of the parts. Fig. 29 is a plan view of a machine embodying my invention, with the sub-base thereof arranged for the reception of a typewriter to be placed thereon and showing in dotted lines the outline of a typewriter in place thereon. Fig. 30 is an end view of what is shown in Fig. 29. Fig. 31 is a detail sectional view of a stop mechanism made use of in connection with the operation of multiplication, the different positions of a portion of such mechanism and its control being shown, as already stated, in Figs. 12, 13 and 14. Fig. 32 is a detail cross-sectional view on the line 32—32, Fig. 1.

The frame work of the apparatus is indicated by the reference numeral 1, the right hand portion 2 thereof—looking from the front—containing the actuating apparatus, and the left hand part 3 being devoted to the calculating and printing mechanism (Figs. 1 and 2). Covers 2' and 3' are provided for these parts of the machine, respectively. A thumb-screw 2$^a$ in a bracket 2$^b$ may be used for securing the cover 2' in place. The part containing the calculating mechanism has end walls 4 and 4$^a$, the former serving as a partition between the parts 2 and 3. The machine is arranged in such manner that it may be used alone, as a self-contained calculating machine, or in connection with a typewriter, and in the form illustrated such change may be effected by providing the machine frame 1 with a sub-base 5, having four legs 6, one at each corner. These legs 6 are hollow and are partially filled, as with blocks of rubber or like material 7, 7, leaving open end portions or sockets 8, 8. When the device is used alone as a calculating machine, the cover 2' is permitted to remain in place, and the sub-base 5 is secured beneath the machine frame 1, as by means of a screw or other clamp 9, with its legs 6 projecting downwardly as shown in Fig. 3. When, however, the device is to be used in connection with a typewriter, the cover 2' is removed, and the sub-base 5 is taken off and inverted, and then moved lengthwise of the machine, as shown in Figs. 29 and 30, and two of the legs 6, 6, at one end passed upwardly through openings 10, 10 provided in the machine frame 1 for that purpose, the two remaining legs 6, 6, extending outwardly and upwardly from beneath the machine frame at its opposite end, in which portion the sub-frame 5 may be secured by the same clamp 9 in inverted position. The sockets 8, 8, in such position serve to receive the legs or standards of a typewriter, which are received therein and rest upon the material 7, 7, within the sub-base legs 6. Other arrangements for receiving and positioning a typewriting machine in place may, of course, be resorted to, that shown being of dimensions and form which will accommodate a known form of typewriting machine in general use.

The machine is of the type in which a single set or row of keys is used, which keys may be used selectively to give a number in any given column, an escapement being used to pass from one column to another. In the form shown, keys for producing the characters 0, 1, 2, 3, 4, 5, 6, 7, 8 and 9, are provided, but, of course, a different number of keys might be used, if desired.

A shaft 11 extends through the right hand part 2 of the machine and has a bearing in the partition 4, and extends for a short distance beyond said partition into part 3 of the machine (Figs. 2, 15 and 19). A light spring 12 (Figs. 2 and 15) may be coiled about the shaft 11 and serves to return said shaft after partial rotation to normal position where it is stopped by connected parts to be referred to hereafter. The spring 12 also tends at all times to move the shaft 11 endwise toward the compartment 3, or a separate spring may be provided for this purpose.

A principal part of the operation of the machine is secured by imparting definite partial rotations to the shaft 11, the degree of such rotation corresponding to the key selected. The arrangement provided for imparting such partial rotation to the shaft 11 comprises a number of tangential facets formed on the shaft 11, or on parts secured in convenient manner thereto. In the construction shown (Figs. 3–7), said tangential facets are formed upon rings or sleeves 15 which are secured to the shaft 11 at separated points in its length. Each of the rings or sleeves 15 has two of the tangential facets 16 and 16'. The facet 16 of each pair thereof (the one to the right) is made use of in the operation of addition and multiplication, while the other facet 16' is made use of in the operation of subtraction, upon slight endwise movement of the shaft 11, as will be hereinafter explained. Set opposite the addition facets 16, 16 of the shaft 11 are the slide bars 17 which are mounted to slide in accurately formed guides 18, 18 in the part 2 of the machine frame, and are provided with rectilinear facets 19, 19 coacting with the facets 16, 16. The facets 16, 16 are set or formed at varying angles upon the shaft 11, according to the degree of rotation which is desired to be imparted thereto, and as is shown clearly in Fig. 6, the range of inclination running from 9° from the vertical, to 90° therefrom or substantially the horizontal position, the inclination between the facets corresponding to successive numerals, being greater by 9° in each case, that is to say, the inclination of the facets to the vertical is 9°, 18°, 27°, etc., up to 90°.

As will be noted, the slide bar 17 and ring or sleeve 15 for the numeral 1 is duplicated. When the apparatus is used in connection with a typewriter, which customarily uses the small letter "l" for the figure 1, it becomes desirable to provide a second set of facets and a second slide bar in such position as can be operated from the typewriter key carrying the small letter "l".

The slide bars 17, which preferably are arranged with their working faces 19 in a substantially vertical position, are moved to slide them lengthwise by mechanism properly adapted to this purpose. In the form shown, key levers 20, pivoted on the shaft 20ª and projecting from the front of the machine, and bearing keys 21 are connected with the slide bars 17, as by means of projections 22 thereon, fitting within the slots 23 in the key levers, such arrangement making provision for such slight movement longitudinally of the key bars 20, as may be present. Springs, as 24, are provided to normally hold the key levers 20 in elevated position. It will be seen that upon striking one of the keys 21, the slide bar 17, which normally is sufficiently high to give a slight clearance between it and the corresponding facet 16, is depressed and comes in contact with the corresponding facet 16 of the shaft 11, and rotates such shaft through an angular extent determined by the normal angular position of the facet 16, and such rotation continues until the facet 16 and the working face 19 of the slide bar 17 are in rectilinear contact and rest flat against one another. The shaft 11 is thus locked in its adjusted position so long as the slide bar is depressed, and the extended contact between the facet 16 and the working face 19 of the slide bar 17, serves to establish a limit to the rotation of the shaft 11 so that, even if the slide bar is vigorously depressed, the inertia of the rotating shaft 11 cannot operate to carry the shaft too far, as its rotation is positively terminated upon the facet 16 and face 19 of the slide bar coming into straight-line contact, as illustrated in Fig. 5; but, notwithstanding the fact that the shaft 11 is held against rotation in either direction, the key lever and slide bar 17 may be depressed still further and any desired operation may be carried out by the parts connected with the slide bar 17 without causing any change in the angular position of the shaft until the slide bar 17 has been permitted to rise, whereupon the shaft 11, actuated by the spring 12, will return to the normal position. It must be understood, of course, that while the right line contacting position of the facets 16 and slide bars 17 is here illustrated as vertical, the particular arrangement may be varied and the slide bars 17 may move in directions other than the vertical.

In order that the slide bars 17 may be actuated either by the keys 21, with which the calculating mechanism is permanently equipped, or by the number keys of a typewriter when a typewriter is used in connection with the apparatus, (see Fig. 30) these slide bars 17 are preferably so arranged so as to be placed directly beneath the number key levers of a standard form of typewriter, and for this reason, in the form of construction shown, the slide bar, corresponding to the number 1, is duplicated immediately beneath the typewriter key lever bearing the letter L, and the shaft 11 is provided with an extra set of facets, corresponding to such slide bar. The slide bars 17 are provided with top bearing surfaces 17' extended in a lateral direction, as clearly shown in Figs. 2, 3 and 4, in order that the number key levers of the typewriter may always rest thereon when the typewriter has been set in place upon the apparatus. As will appear hereinafter, a slight endwise movement may be imparted to the shaft 11 which will bring the facets 16' opposite the slide bars 17, so as to be actuated thereby when the shaft 11 is in such adjusted position, and the shaft 11 may be shifted still further endwise, in which case the typewriter may be operated as usual and without affecting operation of the calculating machine.

In order that the operation of subtraction may be carried out as is hereafter explained, the relation between the facets 16 and 16' of each set is such that the sum of the angles formed by the two facets of a pair and the vertical is always equal to 90°. For example: for zero the addition facet 16 is vertical, (the shaft 11 remaining stationary for addition of zero) while the corresponding facet 16' is horizontal, making an angle of 90° to the vertical; for the numeral 1 the addition facet 16 is at 9° from the vertical, whereas the subtraction facet 16' makes an angle of 81° from the vertical, and so on for the rest. The facets 16 and 16' of each pair therefore, stand at an angle to one another except in the case of the facets corresponding to the numeral 5, in which case both facets of the pair lie in the same plane (see Fig. 6).

The calculating mechanism proper includes a plurality of sectors 25, (of which nine are shown in the present drawings) in connection with each of which is provided a toothed wheel 26 (Figs. 19, 20 and 21). These parts and the related mechanism will be more fully described hereinafter. The toothed wheels 26 are actuated by means of a pawl 27 so as to always be rotated in the same direction, as indicated by the arrow on Fig. 20. This pawl 27 has two movements; a rotary movement about the axis of the wheels 26, and a longitudinal movement transversely of the wheels 26. By means of devices provided for effecting such longitudinal movement, this pawl 27 may be brought opposite any given one of the wheels 26 and if, while in such position, rotary movement is imparted thereto, the wheel 26 will be rotated through a distance corresponding to the angular movement imparted to the pawl 27, and the arrangements of the parts are such that, under normal conditions, the pawl 27, after having completed its angular movement, is moved transversely of the wheels 26 to a position opposite the wheel 26 corresponding to the next lower order of figures. That is to say, the arrangements are such, for instance, that when the pawl 27 is opposite the wheel 26 corresponding to the millions, and a key is struck and the angular movement is imparted to the pawl corresponding to the key which is struck, thereupon by the operation of an escapement, the pawl 27 is immediately and automatically removed to a position opposite the wheel 26 corresponding to the hundred of thousands, and so on down the scale. The pawl 27 is mounted on a U-shaped frame 28 provided with a guide bar 29. The pawl 27, as clearly shown in Fig. 22, comprises a spur 27ª, a short spur 27ᵇ at the opposite end, and an intermediate U-shaped portion 27ᶜ provided with openings 27ᵈ for receiving the guide rod 29. An arm 30, curved in the form of the arc of a circle, passes between the legs of the U-shaped portion 27ᶜ and serves to impart longitudinal movement to the pawl 27. The pawl 27 receives its angular movement from the fact that it is carried by the frame 28, which is mounted to turn upon an axis coincident with the axes of the wheels 26 and longitudinally in line with the shaft 11. The shaft 11 carries an arm 31 which has an opening 32 for receiving a pin 33 on the frame 28. This form of connection, as will be observed, provides for movement of the shaft 11 and arm 31 to and away from the frame 28, and at the same time serves to impart rotation from the shaft 11 to the frame 28, and thereby to the pawl 27 carried by such frame. Since the arm 30 is curved on the arc of a circle which has its center coincident with the axes of the wheels 26, the pawl 27 is free to move into various angular positions, notwithstanding the fact that the arm 30 is always straddled by the U-shaped portion 27ᶜ of the pawl 27.

As already noted, movement transversely of the wheels 26 is transmitted to the pawl 27 by means of the curved arm 30. This arm 30 is attached to a slide bar 34 extending transversely of the machine at or near the bottom thereof, (see Fig. 19) and as will be apparent from the plan view in Fig. 2, this slide bar 34 which is guided by passing through an opening in the partition wall 4, at its opposite end, has connected therewith, or is formed into, an escapement bar 35 formed with notches 36—36 on its opposite edges, which, with co-acting parts, make up the principal escapement. (See Figs. 8 and 9). A bar 37, preferably parallel to the bar 35 and having notches 38, is provided and forms a secondary portion of the escapement for use in the operation of multiplication, and to which I shall have occasion to refer later. Extending transversely of the escapement bar 35 is a slide bar 39 which is resiliently pressed in the direction indicated by the arrow on Fig. 10 by means of the spring 40, such spring, as shown, being connected to an upward extension 41 of the slide bar 39 at one end, and at the opposite end to a stud 42 projectng upward from the base plate of the machine frame and received within the slot 43 in said slide bar 39.

The slide bar 39 (Fig. 10) is provided with two upstanding studs or lugs 42' and 43', one on each side of the escapement bar 35, and at a distance apart equal to or slightly in excess of the depth from the bottom of one of the notches 36 on one side to the outer margin or edge of the corresponding notch 36 on the opposite side, and the escapement bar 35 is provided with a central slot 44 in which is received an upstanding stud or pin 45 provided with a roller 46, by which the escapement bar 35 and the bar 39 are guided, and this pin 45 serves as a stop for limiting the extreme movement of the escapement. When the lugs or studs 42' and 43' are in line, the notches 36—36 at the opposite side of the escapement bar 35 may be out of line to an extent corresponding to the thickness of such studs or lugs 42' and 43', or, as is shown in Fig. 10, the notches 36, 36 may be in line with one another on the two sides of the escapement bar, in which case the studs 42' and 43' are out of line to an extent equal to the thickness thereof. The bar 34, including the escapement portion 35, is moved in the direction of the arrow on Fig. 2, by means of a coiled spring placed within the barrel 47, and having connected thereto a cord or flat band 48, which, with the parts arranged as shown, passes over a pulley 49 and is secured to the escapement bar 35 at 50. The bar 34 and escapement bar 35 may be moved in the opposite direction, that is, toward the left, as seen from the front of the machine, to "charge" the escapement, by means of the thumb piece 51 (Fig. 1) which passes through the cover slot 51$^a$ and has attached thereto a pointed indicator arm 52 placed substantially opposite the pawl 27 and serving to indicate the position of the pawl 27 with respect to the series of number wheels 26 by pointing to the corresponding sector 25, the thumb piece 51 being secured directly upon the skeleton frame-work 53 which is attached to a front extension piece 54, which in turn is rigidly connected to the slide bar 34 (Fig. 19). The frame-work 53 is perforated or notched so that it may move on guide bars 55 and 56 secured to the machine frame. The extension 54 of the bar 34 carries a piece 57 terminating in a downwardly pointed nose 58, and which is devoted to use in connection with the operation of multiplication, and the purpose of which will be described hereafter. The frame 53 also has a projecting nose 59 formed thereon, which serves as a stop member, its operation also being hereinafter described.

The bar 39 is actuated from the key levers 20, as shown in Figs. 2, 4, and 8. Running transversely beneath the shaft 20$^a$ is a master bar 60 which is carried by arms 61 pivoted upon the shaft 20$^a$, serving also as a pivot shaft for the keys 20. The central one of the three arms 61 by which the bar 60 is carried is provided with an extension 62 which carries a pin 63, working in the slot 64 on an arm 65 of the bell-crank lever 66 which is pivoted at 67 to an upright 68 secured to the machine frame. The lower arm 69 of the bell-crank lever 66 carries a pawl 70 pivoted to the arm 69 at 71, and having a stop pin 72 and provided with a leaf spring 73 for returning it to the position against said stop pin 72. Upon depression of the master bar 60 and arm 61 connected therewith, which occurs when any one of the slide bars 17 and key levers 20 are depressed, the pawl 70, working against the extension 41 of the slide bar 39, serves to move said slide bar 39 toward the rear of the machine, which rearward motion is continued until the end of the pawl 70 passes over the top of the upward extension 41, whereupon the bar 39 is released, and under the action of the spring 40 it is returned in the direction of the arrow on Fig. 10 until it again assumes the position shown in such figure. By this means the bar 34, under an endwise tension from the main spring, is permitted to advance one step at each operation of any key lever 20, but such advance does not take place until at or near the maximum depression of the key levers 20, it being necessary for the lug 42 to move rearwardly far enough to clear the tooth engaged by it before the escapement bar 35 is free to be moved longitudinally. Such arrangement results in the pawl 27 being moved from a position opposite any one of the number wheels 26 to a position opposite the next lower wheel 26 (first to the right) after the wheel 26, originally opposite the pawl 27, has been turned through its appropriate angle.

As will be observed (Figs. 2 and 8), the bar 34 and the escapement bar 35 may be pulled in the opposite direction by the thumbpiece 51 without hindrance from the lugs 42′ and 43′, since the lug 42′, as the escapement is pulled in such direction, climbs the back of each tooth 36, carrying the transverse bar 39 and lug 43 along with it, and as the point of each tooth is passed, the spring 40 serves to return the bar 39 to the position shown in Fig. 10, and upon further pulling to the left, this operation of climbing the back of the teeth and being projected to the bottom thereof, by the spring 40, will be repeated. To move the bar 34 and escapement bar 45 in the opposite direction, however, it is necessary to pull the transverse bar 39 against the spring 40, as has been explained, and as may be accomplished upon the depression of the key levers 20 and the operation of the connected parts.

The sectors 25, which have already been referred to, carry base plates 73 (Figs. 2, 19 and 21), upon which are arranged, side by side, the numbers 1—9 and their complements, and also carry at each end a pair of zeros opposite one another. The numbers used, of course, would differ if a different number than 10 keys were used. These numerals in the two rows are preferably of different colors, the right hand ones corresponding to facets 16 may be black and the left hand complementary numerals corresponding to the facets 16′ may be red. These sectors 25 are formed with radial arms 74 terminating in hubs 75, having openings 76 which turn upon the hollow shaft 77 arranged in the portion 3 of the machine housing and in line with the shaft 11. The number of such sectors may be varied according to the number of figure columns used. Corresponding to each of the sectors 25 is a number wheel 26 which is preferably provided with forty teeth 77′, as shown, there being 10 teeth, with such arrangement, in each quadrant of the number wheel, and there being one spoke 78 for each quadrant. Of course, a different number of teeth could be provided and the wheel made smaller or larger, as might be desired. The wheels 26, like the sectors 25, turn freely upon the shaft 77, and the spokes 78 thereof are each provided with sidewise extending lugs 79 near the outer end thereof, the direction in which such lugs 79 extend being toward the corresponding sector of the set (Figs. 19 and 20). Each of the number wheel and sector sets also include a cam plate 80 (Fig. 19) which is interposed between the sector 25 and the number wheel 26, and is rigidly secured to the shaft 77 so that the cam plate remains fixed, unless the shaft 77 is rotated. Such cam plates 80 are provided with concentric portions 81 and with notches 82 and projecting hook-shaped portions 83 adjacent to one end of the concentric portion 81, and such slots 82 extend inward at an angle from the periphery of the cams 80. The shanks 74 of the sectors 25 are slotted, as shown at 84 (Fig. 21), and are provided with slide members 85, each having a nose 86 projecting through the slot 84 and being provided with suitable guide members, such as the turned over points 85′, to aline the slides 85 so that they may move longitudinally of the shanks 74, as indicated in dotted lines in Fig. 21. The nose 86 of each of the slide members 85 projects inward from the sector toward the corresponding number wheel 26 and co-acts with the lugs 79 upon the wheels 26 and also with the cam plate 80. On the side of the shanks 74 opposite the nose 86 the slide members 85 are provided with pawls 87 (Figs. 20 and 21) which serve to do the carrying from one number wheel set to the next. A series of pawls 88 upon the shaft 89, one for each of the number wheels 26, and which said shaft is held by the spring 90 so as to bring the pawls 88 into engagement with the wheels 26, serve to prevent reverse motion of the wheels 26, but such pawls 88 may be put out of action by manipulation of the outwardly extending handle 91 provided for that purpose, by turning said handle against the action of the spring 90. The means for actuating the pawl 27 to impart rotary movement to the number wheel 26 and to bring it opposite any given one of the set of number wheels have already been described. By action of the spring 12, such pawl 27 is always returned to normal position, as shown in Fig. 20, at substantially the lower side of the number wheels 26 after each angular movement due to the rotation of the shaft 11.

The pawl 27 is not provided with any spring, but provision is made for insuring that it shall be in contact with the particular wheel 26, which it may be opposite, as its angular movement is begun, and for insuring that it shall be out of contact therewith except during its upward movement, and for this purpose a leaf-spring 92 is provided, which is secured in place upon the member 54 and serves the function of a cam as well as a spring, and for this reason it may be termed a cam-spring. As the pawl 27 moves toward the spring 92, the nose 27$^a$ thereon rides up on the back of the teeth 77′ of the wheels 26 and out of engagement therewith, and the nose 27$^b$ of the pawl 27 coming in contact with the cam-spring 92 the pawl is thereby turned on its pivot, thus positively moving the nose 27$^a$ away from the teeth 77′ of the wheels 26 and maintaining it out of contact therewith until its upward movement is begun. Upon upward movement being imparted to the pawl the nose 27$^b$ is retarded by contact of the cam-spring 92 therewith, thus positively bringing the actuating nose 27$^a$ toward the periphery of the wheel 26 which is opposite thereto and in contact with the teeth 77′ thereof, and the pawl 27 maintains such contact with the teeth 77′ until it has reached the highest point in its stroke, and the wheel 26 is turned through a distance corresponding to the movement imparted to the pawl 27. Upon the return of the pawl 27 the nose 27$^a$ rides up on the back of the teeth 77′ and the operation already described is repeated.

For obtaining an extraordinary positiveness of operation the cam-spring 92 may be provided with special holding means to co-operate with and hold the nose 27$^b$ of the pawl 27. For instance, the cam-spring 92 may be provided with a small recess or opening 92$^a$, as is best shown in Fig. 20, and in which the nose 27$^b$ of the pawl 27 may be received and the pawl 27 thereby held with the utmost certainty so as not to contact with the teeth of the wheels 26 when in retracted position, and the nose 27$^b$ may be thereby retarded somewhat more positively to throw the pawl 27 into operative position as its upward movement is begun. The provision of such means as the recess or opening 92$^a$ is not essential, however, and the same may be dispensed with if desired.

It will be understood, of course, that the play of the member 92, considered as a spring, is extremely slight, very little spring play in either direction being required to enable its coaction with the pawl 27 and the nose 27$^b$ thereof to take place in the manner described.

It will be seen that upon rotation of the particular pawl 27, due to the depression of a particular key, such rotation will extend through an angle dependent on the angle between the working face 19 of the slide bar 17 corresponding to such key and the corresponding facet 16. If, for instance, the key corresponding to the number 1 be struck, the number wheel 26, opposite which the pawl 27 lies, will be moved a distance of one notch. If the key corresponding to the number 2 be struck, it will be moved two notches, and so on, and will be held against backward movement by the pawl 88. The sector 25 corresponding to the wheel 26 will also be advanced with the wheel 26, being carried forward by the engagement of the nose 86 on the slide 85 with one of the lugs 79 of the wheel 26. When the wheel 26 has been moved to such angular extent that the stud 86 has passed over the concentric portion 81 of the cam 80, which distance will be traversed when the number wheel has been moved through nine notches, the stud 86 comes into contact with the hook 83, and upon the next forward movement of one notch of the number wheel, the nose 86 of the slide 85 is forced downward on the shank 74 of the sector to the bottom of the notch 82 and is thereby moved inward to a point beyond the lug 79 of the number wheel, by which the nose 86 and sector 25 have been pushed forward up to such time, and thereby freed therefrom, and the sector 25 is moved backward by the action of its individual spring 93, with which each of such sectors are provided, and such backward movement of the sector 25 continues, the nose 86 riding up out of the notch 82 onto the concentric portion 81 of its cam 80, and thus moving the slide 85 out until the nose 86 on the slide 85 comes into contact with the succeeding nose 79 on the next spoke of the number wheel 26, whereupon it will be stopped at such position and again carried forward until disengaged by the inward movement of the slide 85, caused by the nose 86 entering the notch 82, as already described. In addition to disengaging the nose 86 from the lugs 79, the inward movement of the slide 85 performs a second function, namely, the pawl 87, during the inward movement of the slide 85, comes into contact with the toothed periphery of the number wheel 26 next higher in the series, and moves it, and consequently the corresponding sector 25, forward through an extent equal to one notch, thus serving to carry the 10 to the next higher wheel of the series, as will be understood, so that the number wheels 26 serve the function of total wheels of the accumulator on which the totals are set up and carried, while the sectors 25, bearing figures on their faces, are adapted to display the accumulated totals set up on the total wheels. When not engaged in performing its transfer function the pawl 87 is held out of contact with the corresponding wheel 26 by means of the nose 86 riding upon the concentric portion 81 of the cam 80.

When it is desired to set all the number or total wheels back to zero it is only necessary to disengage the pawls 88 by operating the handle 91 (Figs. 1 and 19), whereupon each of the sectors 25 will be returned to zero position by means of its spring 93 carrying its wheel 26 along by reason of the contact between the noses 86 and lugs 79, at which position they will be stopped by means of the light tongues 96 on a rack 97 which normally ride over the noses 79 on the wheels 26, and drop behind the same and serve to act as a uniform stop for backward movement, in order to set the sectors all at "0" and the number or total wheels 26 in corresponding position.

This portion of the machine, as already stated, is covered by a cover 3' (Fig. 1). Such cover is provided with a slot 98 opposite the forward pair of zeros on the sectors 25 when in normal position, and behind this slot is a perforated slidable window 99 which is provided with a number of openings 100, just large enough to show one of the numerals on the sector 25 therethrough. This window 99 has its openings normally opposite the left hand number on the sectors, but may be moved longitudinally so as to cover the left hand numbers and uncover the right hand numbers.

For carrying out the operation of subtraction I make use of the device of adding the subtrahend to the complement of the minuend and taking the complement of the sum so obtained, the carrying operation, however, taking place between 10 and 1, instead of between 9 and 10, as is the case in the ordinary operation of addition, but, in order to prevent confusion of the operator, I provide means for shifting the window 99 when complements are used so as to prevent this fact from appearing. The change in the carrying operation is caused by turning the cams 80 through a space equal to one of the notches of the wheels 26, and in order that this result and the shifting of the window 99 may be accomplished by a single means, I provide connections between the window 99 and the means for moving the cams 80, and so arrange the connections that when the cams 80 are moved to effect the modified carrying operation between 10 and 1, instead of between 9 and 10, the openings 100 in the windows 99 will be opposite the right hand, preferably the red figures on the sectors 25, and thereby the operator will not be confused, since the members which will appear through the windows will apparently be the same as for the operation of addition, and while their complements are actually made use of, the operator will be unaware of this fact. In order that the operations requiring the use of complements may be carried out by means of the keys showing the numbers of which the complements are actually used, it is also necessary to provide means for longitudinally shifting the shaft 11 to bring the complement facets 16' before the slide bars 17 in the place of facets 16.

These various results may be accomplished as follows: Extending through the hollow shaft 77 is a shaft 101 (Figs. 2, 18 and 19), which projects from the inner end of the hollow shaft 77 into contact with the end of the shaft 11. At its opposite end the shaft 101 projects from the end of the machine and is provided with a preferably knurled knob 102 (Figs. 1, 2 and 19). Slightly beyond the point where it leaves the hollow shaft 77 this inner shaft 101 has secured thereto a disk 103 having a cut-away part 104 (Figs. 18 and 19), within which there projects the pin 105 fastened on the arm 106 which is rigidly secured to the hollow shaft 77. The arm 106 (Figs. 19 and 23) is provided at its top with a head 107 having an inclined slot 108 formed therein, and the window 99 has secured thereto a pin 109 which is received both in the slot 108 in the arm 106 and also in the longitudinal slot 110 in the cover 3', and which slot 110 serves as a guide for the pin 109. It will be seen that angular movement of the arm 106 will be transferred into longitudinal movement of the window 99 and that when the arm 107 is moved slightly in the direction in which the knob 102 is turned, the window 99 will be moved lengthwise, and will therefore cover one set of figures on the sectors 25 and uncover the other set of figures, the extent of motion induced by the inclined slot 108 being just sufficient for the purpose of transferring the openings 100 in the window 99 from over one set of numerals to a position over the complement set. As the arm 106 is fastened rigidly to the hollow shaft 77, the latter turns therewith, and by the rotation of the shaft 77 the position of the cams 80 thereon is changed in such manner that the carrying will take place between 10 and 1 in the manner necessary for effecting the complementary subtraction scheme referred to above. The knob 102 is provided with an arrow 111 which normally stands upright as shown in Fig. 1 and points toward the letters "Add" at the top of the casing. The letters "Sub" placed at substantially 90° from the top and at the forward side of the machine indicate the position of the arrow 111, to which the knob 102 must be turned for the operation of subtraction. Such rotation turns the disk 103 until the edge of the cut-away part 104 comes into contact with the pin 105, as is shown in Fig. 19. During the latter part of such rotation the pin 105, which is connected to the arm 106 rigidly secured to the shaft 77, being moved by coming into contact with the wall of the cutaway part 112, causes a slight turning of such arm 106 and shaft 77, thereby producing the desired shifting of both the cams 80 and window 99.

The endwise movement of the shaft 11 is preferably produced by means of a thumb-lever 113 which projects through a slot 114 in the end of the machine frame and is pivoted at 115 and is provided with two extensions 116 and 117, the former substantially in line with the main portion of the lever 113, and the latter being directed upwardly (Figs. 1, 2, 18, 19 and 24). The extension 116 terminates in a point 118 which may be received in a notch 119 in a lever 120 to be referred to hereafter in connection with the description of the printing mechanism. The upward extension 117 terminates in a horizontally extending cam-shaped portion 121 which co-acts with the disk 103 on the shaft 101 (Figs. 18 and 24). If the lever 113 is depressed sufficiently to move the point 118 to enter the notch 119 of the lever 120, the disk 103 and the shaft 101 are displaced just enough to move the shaft 11, which is in contact with the end of the shaft 101 projecting from the hollow shaft 77, longitudinally a sufficient distance to bring the facets 16' in front of the slide bars 17 in place of the facets 16, and if the lever 113 is depressed to its full extent to throw the point 118 upward beyond the notch 120, the disk 103 and the shafts 101 and 11 are moved so far that both sets of facets 16 and 16' are moved to such an extent that the slide bars 17 no longer contact therewith, and in such position the typewriting machine may be used without operating the calculating mechanism. The split leaf spring 123 (Figs. 18, 24 and 32) is provided to hold the disk 103 and the shaft 101 in normal position when the cam portion 121 is out of contact with the disk 103. The spring 12 serves to return the shaft 11 to normal position with the facets 16 opposite the slide bars 17 when the lever 113 is brought back to normal elevated position. In order to prevent rotation of the knob 102 and the shaft 101, except when the lever 113 is in elevated position, the shaft 101 is provided with a laterally projecting pin 124 which may be received in the slots 125, 126 in the reinforcement 127 of the end piece 128 of the machine frame and which are guarded by means of pins 129 and 130 (Figs. 18, 24 and 32).

In order to carry out the operation of subtraction, therefore, it is only necessary for the operator to move the knob 102 from the "add" to the "sub" position, and depress the thumb lever 113 half way, and write down the minuend in the ordinary manner, the carriage being initially set opposite the highest number to be written and progressing step by step to the right under the operation of the escapement until the entire number is written. The extent to which the number wheels and sectors are actuated in such operation is that corresponding to the complements of the figures in the minuend, but this will be unknown to the operator, since the complement of the complement, or the original number, will be exhibited in the red numerals through the window 99, and after the minuend is so written the lever 113 is brought back to its original elevated position, to restore the facets 16 to positions opposite the slide bars 17, when the carriage is properly set for beginning the writing of the subtrahend and the figures thereof are then struck in succession, whereupon the result of the subtraction will be indicated in the red numerals which will appear through the window, the modified carrying for this operation having been automatically performed by means of the angular change in the position of the cams 80 and resulting from the movement of the knob 102. The remainder can then be recorded and the knob 102 turned back to normal "add" position and the numeral sectors brought to zero position by means of the handle 91.

For example, to perform the following simple subtraction:

```
    8634
    3544
    ----
    5090
``` the "sub" setting is made, the lever 113 is pressed down half-way, the carriage brought to the thousands column and the 8, 6, 3, 4 keys struck in succession, thus moving the thousands, hundreds, tens and units wheels and sectors into the same position as if the complemental numbers 2, 4, 7, 6 had been struck in ordinary position of the parts. The window, however, shows 8, 6, 3, 4 in red. The lever 113 is now brought back to its ordinary position, the escapement again brought to the thousands column, and the 3, 5, 4, 4 keys of the subtrahend are struck in succession. Except for the changed position of the cams 80 this would give an ordinary addition as follows:

```
    2476
    3544
    ----
    6020
``` and if the operation were carried on in this way the window would show in the red complementary figures a remainder of 4080 which, of course, would be incorrect.

By reason of the changed position of the cams 80, however, so that transfers do not take place between 9 and 10 but between 10 and 1, as already explained, this addition is modified so that it takes place as follows:

```
    2476
    3544
    ----
    5010
``` and the red complementary figures on the sectors 73 appearing, the correct result 5090 is given, as will be apparent from reference to Fig. 2 and sectors 73 shown therein. Tracing this modified addition through, it will be seen that in adding the unit column and obtaining thereby only a total of 10 the 0 only appears and nothing is transferred as the transfer device has not yet come into action. In the tens column, however, a total of 11 is obtained and the transfer mechanism is operated, the new figure appearing in the tens column being one, and one being transferred to the next higher or hundreds column, and in adding the 5 to the 4 this one is carried, making a total of 10. This total being only 10 does not involve any carrying or transfer, however, so that the 0 only appears. Only the 3 and 2 in the thousands column are added, making a total of 5, and in this way, by means of the changed position of the cam 80, a total is obtained, the complement of which is the correct result of the subtraction being performed.

As an additional example of the operation of subtraction, take the subtraction

```
    709,302
    560,920
    -------
    148,382
```

It has already been noted that with the setting for subtraction the transfer action does not come into action between 9 and 10, but the parts are shifted so that it comes into play between 10 and 11; also that the subtraction complementary facet 16' corresponding to the zero key is at 90° from the vertical, so that when the subtraction setting has been made, actuation of the zero key will result in a movement of the actuated toothed wheel and sector through 90° or 10 notches. By reason of the shift of the transfer mechanism, no carrying will take place, advance of still another notch being necessary for carrying and further, though 10 is set up on the toothed wheel zero will appear in red at the window. Having reference to the toothed wheels then, they will be set up as follows on striking the digits of the minuend:

3 (10) 1 7 (10) 8

Upon operating the lever 113 as before, bringing the escapement to the proper point and striking the keys of the subtrahend, the following addition takes place on the toothed wheels, the carrying being effected between 10 and 11 as already explained:

```
3 (10) 1 7 (10) 8
5   6  0 9   2  0
-----------------
9   6  2 7   2  8
``` and the red figures set opposite these figures on sectors 73 (see Fig. 2) display through the window the correct result:

148,382.

In carrying out the operation of multiplication the thing which ordinarily gives trouble is the mental operation of "carrying" which must be performed in writing down the partial products in the ordinary manner. I have found that if this portion of the work is eliminated, and the operation of multiplication reduced to putting down the product of one digit by another without any carrying, and then adding up the results so obtained, it may be carried out with readiness and accuracy even by a person of very ordinary intelligence, since the mere operation of multiplication of one digit by another is so extremely simple and well understood that but few mistakes will be made if the mental operation is confined thereto. For example, in order that this may be readily understood, we may consider a simple problem in multiplation. If, for instance, 458 must be multiplied by 37, the usual way is as follows:

```
    458
     37
   ----
   3206
   1374
   -----
  16946
``` in which the partial products have been obtained by an operation including the mental carrying. The same result might have been expressed by writing down all the products digit by digit, as follows:

```
   1 2
   1 5
     2 4
     2 8
       3 5
         5 6
   ---------
   1 6 9 4 6
``` which gives the same result. For clearness I shall refer to the product of one digit by another as a "small product". It will be remarked that the second small product is displaced one step to the right, and so the following products, and then on passing to multiply by the second figure of the multiplier, the products are shifted back to the left, but by one step less than was the case when multiplying by the first number of the first multiplier. This placing of these small products in proper columns and the addition of same, giving the result of the total multiplication, is performed automatically by means of my improved mechanism, and the operator is not called on to do any carrying mentally.

To effect this result I rearrange the mechanism ordinarily made use of for the purpose of addition in two respects. First, I modify the operation of the principal escapement in such a manner that upon striking the first figure of the first small product in the action of multiplying, the escapement shall operate in the usual manner, but that upon the striking of the second figure of such small product, the escapement shall not be operated so that the subsequent figure struck, which is the first figure of the succeeding small product, is placed in the same column, or in other words, is set up on the same number wheel as the last figure in the preceding small product, so that the effect of adding these two figures, struck without operation of the escapement, shall be secured, and this effect has to be continued for subsequent small products, the total effect secured being that the escapement shall alternately be actuated upon striking two figures thereafter in order to obtain the next actuation of the escapement. This will be apparent from the arrangement of the small products in columns in the example above given. It will be understood that if any of the small products is less than 10, the space bar S which operates the master bar 60 by means of levers S' is used before the single figure is struck, thus preserving the necessary step—no step action of the escapement.

It is apparent that the second partial product, made up of the small products in multiplying by the second figure of the multiplier, will have to begin one step to the right from the point at which the first figure of the first small product made by multiplication by the first figure of the multiplier is placed, and this is the second of the two effects to be secured in adapting the adding mechanism to use in multiplication. These two modifications of the mechanism ordinarily used for addition are preferably obtained through the use of a single actuating means, and the same may be controlled by a button 131 which, in the construction illustrated, is used for actuating both the mechanisms referred to, and is preferably arranged adjacent to the thumb catch 51, the operating controls being desirably grouped together, so far as possible.

An arrangement for securing the stoppage of the main escapement on its recharge one column short of its previous point of stoppage will be first described and is illustrated in detail in Figs. 12, 13, 14 and 31, and also is shown to some extent in Figs. 1, 2 and 19. The button 131 (Figs. 1 and 31) has a shank 132 extending through a slot 133 in the forward portion of the casing cover 3' or of a separate part of the cover of the compartment 3, and is provided with a slide-plate 134 for covering the slot 133 and also for giving an extended bearing so that it may slide smoothly. Attached to the shank 132 of the button 131 is a plate or bar 135 which is provided with a substantially V-shaped notch 136, and beyond the notch 136 the plate 135 is extended for a short distance, the extended part having a flat upper surface 135'. Mounted for vertical movement in appropriate guide slots is the transverse bar 137, and a leaf spring 138 tends to push the bar 137 in the direction of its length, in the form shown such direction being downward. An escapement bar 139 arranged transverse to the bar 137 and supported for lengthwise movement, as by a slotted bracket 3'', is provided with a series of notches 139' on its opposite edges, comprising inclined portions 140, straight bottom parts 141, and right-angle shoulders 142, and the bar 137 is provided with lugs 143 and 144 on each side of the bar 139, and preferably offset slightly from a position opposite one another, as shown. The escapement bar 139 is actuated to move toward the right as shown in Fig. 31 by means of a spring 145 and is provided with a stop-piece 146 which extends in the path of the stop-piece 59 connected with the principal escapement bar 34, as shown in Fig. 19. Ordinarily, the stop 146 is set at the extreme left and serves to stop the escapement on recharge with the pawl 27 opposite the number wheel 26 of the highest order, and the escapement bar 139 is maintained in such position by the button 131 being moved to the right so that the lug 147 on the transverse bar 137 is supported upon the surface of the extension 135', (Fig. 14) thus preventing the bar 137 from moving transverse to the escapement bar 139 and maintaining such escapement bar 139 locked in fixed position with the stop 146 in position to permit the principal escapement to be fully charged. Upon arranging the device for use in the operation of multiplication, however, the button 131 is moved to the left so that the lug 147 of the bar 137 may enter the V-shaped notch 136 in the plate 135, thus leaving the transverse escapement bar 137 free to be pressed downward by the spring 138. The beveled nose 58 on the bar 57, attached to the main escapement bar 34 (Figs. 19 and 31) coöperates with the transverse escapement bar 137, when the same is released, by permitting the lug 147 to enter the notch 136, and as will be seen from the showing in Fig. 31, upon recharging the main escapement by moving the same with the nose 58 to the left, the bar 136 is held against the tension of the spring 138 so as to carry the lug 144 upward beyond the right-angled part 142 of the escapement notches of the bar 139, whereupon the bar 139 is free to move to the right until the lower lug 143 on the transverse bar 137 comes in contact with the beveled portion 140 of the succeeding notch on the lower side of the bar 139, and then when the principal escapement is moved to the right, in writing down the small products making up the first partial product, the nose 58 on the bar 57 is carried to the right beyond the bar 137, permitting it to be moved down by the spring 138 through the remainder of its range of movement, thus permitting the completion of the movement of the escapement bar 139, and consequently of the stop-piece 146 carried thereby, through one step and assuring that when the main escapement is again recharged, before beginning the subsequent partial product upon multiplication by the second number of the multiplier, the main escapement will be stopped with the arrow 52 one column to the right of the position at which it was set when the multiplication was begun.

The stop escapement bar 139, when the connected parts are in position for multiplication, (as shown in Fig. 12) may be moved to the left without being interfered with by the transverse bar 137, as the lugs of such bar are moved in one direction by the inclined faces of the notches on the bar 139, and in the opposite direction by the spring 138, and a projecting thumb piece 148 is provided for this purpose, its shank being permitted to pass beneath the front plate of the machine.

The means for causing the main escapement to skip one advancement every other step so that the traveling carriage will be advanced only one step in response to two key actuations, in order to properly position the columns of the small products so that their addition will give the correct product are also controlled by the button 131. This control is secured through the bar 150 which extends transversely of the machine (Figs. 8, 10, 12, 13 and 14) and is connected at its farther end to the apparatus for causing the intermittent loss of a step by the main escapement. The pivoted lever 151 has a notch 152 at its upper end, in which a lug 153 on the shank 132 of the button 131 may be received, and on its opposite end has a recess 154 adapted to receive a pin 155 on the bar 150. It will thus be seen that when the button 131 is moved to the right, as in Fig. 14, so that the apparatus is set for the operations of addition and subtraction, the bar 127 being held in elevated position by the lug 147 resting on top of the plate 135, the bar 150 will be moved to the left, the direction of movement between the button 131 and the bar 150 being reversed by the lever 151. Fig. 13 shows the parts mid-way in the course of their movement from one position to another, and Fig. 12 shows the parts in the position for the operation of multiplication, the bar 137 being freed from the supporting surface 135' as already explained.

The parts making up the device for intermittently putting the main escapement 35 out of operation are mounted upon a plate 160 (Figs. 2, 8, 9 and 10) pivoted at 161 to the machine base and here shown as T-shaped in general outline. Journaled upon an upwardly extending bracket 162 of the plate 160 is a toothed wheel 163 adapted, when the plate 160 is swung on its pivot, to have the pawl 164 coöperate therewith, which pawl 164 is secured to one of the arms 61 of the master bar 60 pivoted upon the shaft 20ª. It will be remembered that this master bar is depressed by operation of any one of the key levers 20 and space bar levers S', and upon each such depression the wheel 163, when in position to have the pawl 164 coöperate therewith, is turned through one notch. The bar 150 carries on its end a pin 155 (Figs. 8 and 10) which is adapted to enter a slot 156 in an arm 160' of the plate 160, and it will be evident, as shown in dotted lines in Fig. 8, that upon movement of the bar 150 to the left, (Fig. 12) the plate 160 will be turned on its pivot so as to carry the wheel 163 out of coöperation with the pawl 164, and thereby to make the device, as supported on the plate 160, inoperative. The wheel 163 on one side thereof is provided with depressions 165, one for every two teeth of the wheel 163. Pivoted upon the plate 160 is a lever 166, the pivoting point being shown at 167, the lever 166 being, as shown, of T-shape, having legs 168, 169 and 170. The leg 169 terminates in a laterally extending point 171 which is adapted to enter the recess 165 in the wheel 163 as the latter is presented opposite to the point 171. A spring 172, secured upon the plate 160, serves to press the arm 169 in such manner that the point 171 is thrust toward the adjacent side of the wheel 163. The plate 160 has an upward extension 160ª formed with a slot 160ᵇ therein, and a pawl 173 is pivoted to the arm 168 of the lever 166, at 174 and has a spring 175 adapted to hold it against a stop pin 176, the pawl being received in the slot 160ᵇ of the plate 160 and terminating in a sharp pointed nose 177. The main escapement bar 35 is provided with an additional or extension bar 37, with the notches 38 whereof the nose 177 of the pawl 173 is adapted to coöperate. It will be seen that when the parts are in the position shown in Fig. 10, and the point 171 of the lever 166 is received in the lateral depression 165 of the wheel 163, the point 177 is out of contact with the teeth 38 of the extension 37 of the main escapement. When the wheel 163, however, is turned through a distance corresponding to one of the notches thereof upon the succeeding actuation of the master bar 60, and the point 171 rides upon the flat surface of the wheel 163, the lever 166 will be turned, as shown in dotted lines in Fig. 11, against the spring 172, thereby moving the arm 168 thereof and the pawl 173, which together form substantially a dog, to a position where they will come into contact with the teeth 38 of the escapement section 37, and notwithstanding by that depression of the key lever and master bar 60 the transverse escapement bar 39 will be actuated in such manner as to permit the escapement to advance one notch to the right, nevertheless it will not make such advance, but will be held or retained in fixed position, by reason of the point 177 being in contact with a tooth 38. With the next depression of the master bar, however, the point 171 will enter one of the depressions 165, thus releasing the holding dog and throwing the pawl 173 and its point 177 into the position shown in Fig. 10, in which position it will not interfere with the operation of the escapement, and the escapement, upon the depression of the master bar, will operate to advance a step, as usual. By the arrangement of the pawl 173 upon a pivot, as shown, the retreat of the point 177 from contact with the teeth 38 is positive and certain, whereas the point 177, when being moved toward the toothed bar 37, is free to ride upon the back of the tooth 38 and over the point thereof and be in a position for preventing the next forward movement of the escapement, thus giving the correct columnar effect, in carrying on the operation of multiplication. In our claims when we speak of retaining the carriage in a fixed position during two consecutive key operations, it will be understood that the foregoing action is thereby referred to in which the carriage is retained during one key operation in the same position which is occupied at the close of the preceding key operation, the net result of the two consecutive key operations, so far as the escapement is concerned, being its movement for only one step.

A printing mechanism may be provided and is a convenience when it is desired to print or list the figures made use of in the calculating operation. Such printing mechanism is ordinarily out of use but is arranged in such manner that it may be connected up for use when wanted. Such printing mechanism is not included in the claims herein but is illustrated in the drawings and described in the specification in order to afford a clear understanding of how the parts of the calculating machine may be connected up therewith when it is desired to make use of a printing or listing device.

The printing mechanism (Figs. 15, 16, 17 and 24–28) includes a carriage 179 (Fig. 15) comprising spaced side plates 180 and means for securing the same together, as, for example, the cross-bar, and such carriage may carry the paper roll 182 and platen 183, and is preferably slidable lengthwise of the apparatus as upon the shafts 184 and 185, the shaft 185 being a fixed guide shaft, but the shaft 184 being rotatable and movable lengthwise of itself to perform other functions, as hereinafter stated. This portion of the machine is arranged back of the cover 3' and preferably is exposed so that the printing will be visible. The carriage 179 has connected thereto the bar 186 by means of which it is given a step-by-step movement through the lever 187 having a slot 188 receiving a pin 189 on the main escapement bar 34, and pivoted at 190 to the machine base. The member 186 is provided with a lever 191 pivoted thereto at 192 and having a pin 193 projecting therefrom which is received in the slot 194 in the lever 187 (Figs. 2 and 15). It will be seen that by means of this connection between the carriage 179 and the main escapement bar 34, that such carriage, and the paper roll and platen carried thereby, will have a step-by-step movement transversely of the machine imparted thereto in the opposite sense from the movement of the main pawl 37. The detail means for holding the paper in place on the platen and for inking the types are not illustrated, as any known forms of devices for these purposes may be resorted to.

The type bars 195 (Figs. 15 and 24) each carry a lower type 196, the numbers thereon beginning at 1 on the right and running upward toward the left through 9 to 0, and the upper type 197 being the complements of the lower types 196. These type bars are pivoted to turn freely on the slidable shaft 198 and are formed with short right-angled extensions 199 at their bottoms, and a spring 199$^a$ is provided for holding them in their normal position, which is shown in full lines in Fig. 24. The extensions 198 of the type levers are adapted to be struck by a striker 200 to thereby force them against the platen, and this striker is carried by the shaft 184 already referred to. The shaft 184 at its inner end has secured thereto the crank arm 201 which carries a pin 202 which is received in the slot 203 upon one of the arms 61 of the shaft 60 actuated by the depression of the key levers 20. The striker 200 is secured to the shaft 184 at such an angle that its movement to actuate the type bars 195 comes at the extreme end of the movement of the key levers 20 and therefore not until after the proper type bar 195 has been moved to appropriate position before the striker 200.

The movement of the type bars 195 so as to present the arms 199 thereof selectively to the action of the striker 200, is accomplished in the following manner: Loosely pivoted on the shaft 11 is a sector 204 (Fig. 16) having a spiral slot 205 in which is received a pin 206 on an arm 207 secured to the slidable and rotatable shaft 198 upon which the type bars 195 are mounted so as to turn freely but are held against movement longitudinally of the shaft 198 as by stop pieces 208, 208. As will be apparent from Figs. 16 and 17, the rotation of such sector 204 will impart lengthwise movement to the shaft 198 and therefore to the type bars carried thereby. The sector 204 is normally connected to the shaft 11 by means of the arm 209 rigidly secured to the shaft 11 and having a pin 210 entering an opening 211 in the arm 204$^a$ of the sector 204. It will be seen that for any angular position of the shaft 11, due to the depression of the actuating keys and transmitting a predetermined amount of angular movement to the shaft 11, there will correspond a particular one of the type bars 195 which will be presented to the action of the striker 200. The complete rotation of the shaft 11 through the quadrant in which it turns carries the entire set of type bars past the striker 200, as will be understood. The arm 204$^b$ of the sector 204 is interposed between an arm 212 and a hub 213 slidable on the shaft 11. This arm 212 has a hook-shaped extension 214 extending through an opening 215 in the machine frame partition, and as will be apparent from the showing in Fig. 17, the sector 204 may be moved on the shaft 11 so as to disengage its arm 204$^a$ from the pin 210, upon being moved by means of the arm 212 into the position shown in dotted lines in said Fig. 17. The means whereby the arm 212 is actuated for this purpose will be referred to later.

Upon the base plate of the machine and immediately to the right of the printing mechanism and beyond the partition 4, is a slide 216 guided by a suitable guide 217 secured to the base plate (Fig. 15). A notch 218 is formed in this slide and this notch receives the hub of the crank 201 on the shaft 184 already referred to. Such shaft extends through the machine frame and terminates beyond the same at the left hand side thereof in a knob 219 (Fig. 29) and is provided with a shoulder 220 to limit its endwise movement. It will be observed that on pushing this knob 219 in, endwise movement will be transmitted to the slide member 216, and that the shaft 184 is nevertheless free to turn. The slide member 216 has formed therein a slot 221 which receives a pin 222 on the arm 223 rigidly attached to an upright shaft 224 which carries, near its upper end, a second arm 225, likewise rigidly secured thereto, provided at its outer end with a slot 226 and receiving the pin 214 upon the arm 212 projecting through the partition 4 and which has been already referred to. It will be apparent from the showing in Fig. 15 that upon the knob 219 being pushed in and the slide 216 being moved to the right, the arm 225 will be moved into the position shown in dotted lines in the said figure, thus serving to move the sector 204 into the position shown in dotted lines in Fig. 17, in which position it is disengaged from its connection with the shaft 11, as already explained, and when so disengaged, the shaft 11 may be rotated and the calculating features of the mechanism may be made use of, and at the same time the printing devices may be out of use. Such arrangement may be resorted to at any time, as for example, during the operation of multiplication, when, unless the printing mechanism is disconnected, part of the figures would be printed over one another.

The slide 216 has a flat rear face 227 terminating in a notch 228 and nose 229. This face, notch and nose coact with the arm 191' on the lever 191 which carries the pin 193 for connecting the carriage 179 to the main escapement. When the main escapement has been fully discharged, the arm 198 attains substantially the position shown in Fig. 15, and upon movement of the slide 216, by pushing the knob 219, the slide 216 is so moved that the nose 229 engages the arm 191' of the lever 191 and forces the said arm into the notch or depression 228, thereby moving the remaining arm of the lever 191 and the pin 193 out of engagement with the actuating bar 187. In this manner it will be seen that by pushing the knob 219, the carriage for the paper and platen and connected parts, will be disengaged from the main escapement, and that the lever 187, so long as such disengagement is continued, will oscillate back and forth without imparting any movement to the paper carriage, but it may be reëngaged at any time when the escapement is discharged by pulling the knob 219 out. By moving the knob 219 longitudinally, therefore, three separate results are simultaneously secured: The sector 204 is disengaged from the shaft 11; the paper carriage is disengaged from its actuating lever 186, and the pin 202 is withdrawn from the slot 203 leaving the striker 200 stationary. The shaft 184 is provided with notches 184' on its lower side, and a leaf spring 184'' is secured against the contact of the notched portion of such shaft by the arched part of the leaf spring serving to hold it in its various endwise adjusted positions.

I have already described how when the thumb lever 113 is depressed, the point 118 (Fig. 18) is carried into notch 119 upon the lever 120. This movement, which is resorted to during the operation of subtraction when the complements come into play, also secures the result of printing the complements of the complements, or the original figures struck by the operator. This lever 120 carries a sidewise extension 230 which projects beneath a long rod 231 (Figs. 27 and 28) secured to one of the pivoted bars 232 carrying the platen 183 and pivoted on the carriage 179 at the center of the paper roll 182. The length of the extension 230 and rod 231 is such that the rod will always be engaged by the extension in all positions of the carriage. With this arrangement the platen is raised upon movement of the lever 120 resulting from the point 118 being moved into the notch 119 into the position where the upper types 197 of the type bars 195 strike against the platen, as is shown clearly in dotted lines in Fig. 24. An exteriorly projecting button 240 is secured to the lever 120 so that the same may be operated thereby when desired, or moved laterally out of contact with the thumb lever 113 when desired. A spring 120$^a$ is provided to normally maintain the lever 120 in its lowermost position, in which position it is secured by the pin 120$^b$.

The means for imparting step-by-step rotation to the platen upon the movement transmitted to it from the main escapement are shown in Figs. 25 to 28. The left hand frame member 180 has pivoted thereto a link 250 which in turn, at its outer end, has pivoted thereto at 251 an L-shaped lever 252 provided with a hook 253 at its upper end. A spring 254, secured to the lever 252, serves to hold the lever 252 and the link 250 attached thereto in elevated position.

The lever 252 rests at its back against the pin 255 which holds it when depressed in contact with the toothed wheel 256 of the platen 183. The end plate 4$^a$ has a bracket 257 rigidly attached thereto and extending inward toward the carriage 180, and pivoted on the arm 257 is a pawl 258 having three angular extensions 258$^a$, 258$^b$, and 258$^c$. A spring 259 resting against the portion 258$^c$ serves to hold the pivoted pawl with the sidewise projecting portion 258' of the extension 258$^a$ resting against the end of the bracket 257. As the principal escapement is nearing discharge, the link 250 contacts with the right hand side of the downward extension 258$^b$ of the pawl 258 and rocking the pawl 258 against the light spring 259, passes beneath it without affecting the hook 253. Upon beginning to charge the escapement, the carriage 179 moving to the left, the link 250 comes into contact with the inclined left hand side of the extension 258$^c$ of the pawl 258, and as the pawl is held against rotation in the opposite direction, the link 250 is depressed, carrying along with it the lever 252, and the hook 253 contacting with the tooth of the wheel 256 on the platen shaft, serves to rotate the platen for a distance corresponding to one tooth, and this operation is repeated each time the escapement is charged. The usual knob 260 is provided for imparting rotation manually to the platen 183, a spring 261 serving to hold the platen in adjusted position.

The operation of the machine illustrated, and embodying one form of my invention, has been set out in connection with the description of the various parts, but may be now briefly reviewed with particular reference to the action of the various parts which come directly under the attention of the operator.

In making additions the knob 102 is set to "Add" and the figures of each number to be added are struck on the keys 21 or the number keys of a typewriting machine set in the place provided therefor, the proper column in which to begin each number being indicated by the arrow 52, and the escapement handle 51 (and spacer S, if needed,) being used to bring the arrow 52 to appropriate position as each number is begun. The totals appear in black figures in the window 99, and the several numbers may be printed, as they are struck on the printing mechanism or on the typewriting machine, in appropriate relation to other written matter, or on both the special printing apparatus and typewriter. To bring the figures exhibited in the window 99 back to zero, the handle 91 is drawn forward and released.

In subtracting, the knob 102 is brought to "sub" position, being first pulled slightly to the left so that the pin 124 may pass from the slot 125 to the slot 126, thus changing the positions of the cams 80 and shifting the window 99 to uncover the red figures, and the lever 113 is depressed half way. After the minuend has been struck, the figures of the subtrahend are struck, the escapement handle 51 being used to bring the arrow 52 to proper position as before, the thumb piece 113 having first been brought back to elevated position, and the remainder then appears in red figures through the window 99, the operation not being distinguishable to the operator, except by the different setting of the machine, from straight addition, and the correct figures in the minuend and subtrahend being printed on the paper strip as struck, if the printing mechanism is in use.

For multiplication the position of the various control elements so far referred to do not differ from that assumed during addition, but the button 131 is moved to the left, thus freeing the stop escapement and thumb piece 148, which is manipulated to set the stop 146 at the proper point so as to leave room for the number of figures which will appear in the product, and the striking of keys corresponding to the small products of the first partial product is proceeded with, the escapement being automatically held against movement every other step; the escapement is again charged by means of the handle 51, being automatically stopped one column short of its previous starting position by the stop 146, the small products of the next partial product are struck on the keys in order, and this operation repeated until the multiplying of digits by digits has been gone entirely through with, when the product will appear in black figures through the window 99, and the handle 148 need only be used to bring the stop 146 to the extreme left hand position and the button 131 moved to the right to restore the parts to proper condition for making additions.

As an example of a multiplication carried on by the means described, take $793 \times 642 = 509{,}106$. Here it is known in advance that the result will be a number in six figures, as multiplicand and multiplier are each numbers of three figures and the product of the first figures in each is in excess of 9. The button 131 is moved to the left, setting the skip step escapement apparatus into action and freeing the stop escapement and thumb piece 148. The stop 146 is now set in place by means of the thumb piece 148 to start the operation in the sixth column from the right. Then the partial products are struck in order, the escapement being manually recharged after multiplication by each digit of the multiplier, but being automatically stopped by the stop 146 one column short of its previous charged position, and when any partial product is less than 10 a zero is struck in advance of it, thus:

| | |
|---|---:|
| Multiplication by 6 | 42 |
| | 54 |
| | 18 |
| Recharge escapement and multiply by 4 | 28 |
| | 36 |
| | 12 |
| Recharge escapement and multiply by 2 | 14 |
| | 18 |
| | 06 |
| Whereupon the correct product appears | 509106 |

The printing mechanism may at any time be put out of operation by pushing on the knob 219, or brought back into operation by pulling on this knob, it being understood that the main escapement is always fully discharged before making either the disconnection or the reconnection so that the parts may be in proper register. The handle 240 may be used to disconnect the levers 113 and 120, and the thumb lever 113 may further be used, by pushing it fully down, to completely disconnect the calculating mechanism from the key bars of a typewriter placed thereon by moving the shaft 11 lengthwise to such an extent as to remove the facets 16 and 16′ from the action of the strikers 17.

Having thus described my invention, I claim:—

1. In a calculating machine, a series of slide-bars adapted by sliding movement to actuate the calculating mechanism, a series of key levers attached thereto, and said slide-bars being adapted to receive on their tops and be actuated by the number keys of a typewriting machine, substantially as set forth.

2. In a calculating machine, a plurality of movable members adapted by their movement to actuate the calculating mechanism, and means connected thereto at one point in their length to actuate them, and said members being adapted in another part to receive and be actuated by the number key levers of a typewriting machine, substantially as set forth.

3. In a calculating machine, a plurality of movable members adapted by their movement to actuate the calculating mechanism, a plurality of operating keys, one for each member, key levers connecting said levers thereto and said members being adapted to receive and be actuated by the number key levers of a typewriting machine, substantially as set forth.

4. A rotary member provided with two adjacent working faces set at different angles, means for rotating said rotary member by contact with one of said rotary faces and holding the same against further rotation, and means for moving said rotary member lengthwise to bring the second working face opposite the first named means, substantially as set forth.

5. A rotary member provided with two adjacent working faces set at different angles, means for rotating said rotary member by contact with one of said working faces and locking the same against further rotation, and means for moving said rotary member lengthwise to bring the said working face opposite the first named means and for imparting further movement to said rotary member to carry both of said faces out of contact with said first named means, substantially as set forth.

6. A rotary member provided with a substantially tangential flat face, a slidable member adjacent thereto and having a cutaway part normally opposite said rotary member and adapted when moved by sliding to contact with said flat face at the end of said cut-away part to rotate the rotary member through an angle, and upon further movement to contact with said flat face and hold said rotary member against further rotation, substantially as set forth.

7. A rotary member provided with two adjacent substantially tangential flat faces set at different angles, means for rotating said rotary member by contact with one of said flat face surfaces and locking the same against further rotation, and means for moving said rotary member lengthwise to bring the second surface opposite said first-named means, substantially as set forth.

8. A rotary member provided with two adjacent substantially tangential flat faces set at different angles, means for rotating said rotary member by contact with one of said flat face surfaces and locking the same against further rotation, and means for moving said rotary member lengthwise to bring the second surface opposite said first-named means, said means being operable on further movement to carry both of said faces out of contact with said first-named means, substantially as set forth.

9. A rotary member provided with two adjacent substantially tangential flat faces set at different angles, and means co-acting with either of said faces to turn the rotary member through the corresponding angle and then lock the rotary member in position by contact with such surface throughout more than one-half the extent thereof, substantially as set forth.

10. A rotary and longitudinally movable shaft provided with a plurality of substantially flat substantially tangential surfaces, and said surfaces being arranged in pairs, a series of slidable bars, said bars being normally disposed to co-act with one surface of such pairs, and means for imparting longitudinal movement to the said shaft for positioning it relatively to such bars so as to bring the bars into co-action with the remaining surface of the pair, substantially as set forth.

11. A rotary member having a plurality of pairs of substantially flat substantially tangential faces, a plurality of slidable members with their faces adjacent to said rotary member in substantially a single plane substantially tangent to the axis of said rotary member, the distance of tangency of said plane being substantially identical with the distance of tangency of said flat surfaces and the planes of the surfaces in each pair making angles with the plane of the working faces of said slidable members which are substantially complementary to one another, one of the surfaces of each pair being normally opposite the working face of the respective sliding member, and means for moving the rotary member longitudinally to bring the remaining flat surfaces of each pair opposite the respective sliding member, substantially as set forth.

12. In combination, a wheel, a member supported for oscillation at the side of the said wheel and leaving a space between the wheel and the member, means whereby rotation is imparted from said wheel to said member, and means located in the space intermediate between the wheel and the member for limiting the movement of said member under the actuation of said wheel and permitting the member to move in reverse direction, substantially as set forth.

13. In combination, a wheel, means for rotating said wheel, an oscillatory member adjacent to said wheel, there being a space left between the wheel and member, interconnecting means whereby said member is moved from said wheel, and means for disconnecting the said member from said wheel, the interconnecting and disconnecting means being located in the space between the member and the wheel, substantially as set forth.

14. In combination, a sector provided with indicating numerals on its outer face and comprising a radial arm, a slide movable radially on said arm and provided with a projecting nose on one side, and with a pawl on the other side of said arm, substantially as set forth.

15. In combination, a sector comprising a radial arm, said arm being provided with a longitudinally extending slot, a slide movable radially on said arm and provided on one side with a nose projecting through said slot, and on the opposite side with an inwardly projecting pawl, substantially as set forth.

16. In combination, a sector provided with indicating numerals on its outer face and comprising a radial arm, a slide movable radially on said arm and provided with a projecting nose on one side and with a pawl on the other side of said arm, and a toothed wheel on one side of said sector provided with a plurality of projections extending within the path of said nose, substantially as set forth.

17. In combination, a sector provided with indicating numerals on its outer face and comprising a radial arm, said arm being provided with a longitudinally extending slot, a slide movable radially on said arm and provided with a nose projecting through said slot and a pawl on the other side of said sector, toothed wheels on each side of said sector, that wheel on the side where the nose extends being provided with a plurality of projections extending within the path of said nose, and the wheel on the opposite side being provided with a plurality of teeth by which the wheel may be turned under the action of said pawl, substantially as set forth.

18. In combination, a sector, a toothed wheel, a cam intermediate of the sector and wheel, means on said wheel and sector whereby co-action between them may be secured, and said cam being of a contour adapted for terminating the connection between the wheel and sector, substantially as set forth.

19. In combination, a shaft, a sector mounted to oscillate thereon, a toothed wheel rotatable thereon in but one direction, a cam fixed to said shaft between the sector and wheel and serving to bring said wheel and sector into and out of co-action with one another, substantially as set forth.

20. In combination, a shaft, a toothed wheel on said shaft and having a sidewise projection thereon, a sector free to oscillate on said shaft, a movable member on said sector and having thereon means for co-operating with said projection, and a cam for controlling the position of said movable member with respect to said sector, substantially as set forth.

21. In combination, a shaft, a sector mounted for oscillation thereon, a radially slidable sidewise projecting member on said sector, a wheel rotatable on said shaft and having a fixed projection extending sidewise toward said sector, and a cam between said sector and wheel and fixed to said shaft for moving said slidable member into and out of contact with said projection of said wheel, substantially as set forth.

22. A rotary member, means for rotating the same through a predetermined angle, a slidable and rotatable pawl actuated by said rotary member to impart rotation thereto, and manually controllable means for sliding said pawl, substantially as set forth.

23. A rotary member, a slide-way carried thereby, means for rotating said member through a predetermined angle, a plurality of toothed wheels opposite said slide-way, a pawl on said slide-way, and manually operable means for sliding said pawl opposite any of said toothed wheels, substantially as set forth.

24. A rotary member, a slide-way carried thereby, means for rotating said member through a predetermined angle, a plurality of toothed wheels opposite said slide-way, means for preventing retrogressive movement of said toothed wheels, a pawl on said slide-way, and means for sliding said pawl opposite any of said toothed wheels, substantially as set forth.

25. A rotary member including a slide-way, a pawl slidable on said slide-way, a plurality of rotary toothed wheels maintained against backward movement, hand-controlled means for moving said pawl on its slide-way in one direction, an escapement for moving said pawl in the opposite direction, and means for rotating said member and the pawl carried thereby and thereby the toothed wheel opposite said pawl through a predetermined angle, substantially as set forth.

26. A rotary member, a slide-way thereon, a pawl slidable and rotatable on said slide-way, said pawl being provided with an opening for receiving an arm, an arm received in the opening in said pawl and rotatable on an axis substantially identical with the axis of rotation of said rotary member, and a plurality of toothed wheels with which said pawl is adapted to co-act, substantially as set forth.

27. A rotary member, a slide-way thereon, a pawl slidable and rotatable on said slide-way, said pawl being provided with means for receiving an arm, and an arm rotatable on an axis substantially identical with the axis of rotation of said rotary member and received in the opening in said pawl, a plurality of toothed wheels with which said pawl is adapted to co-act, and manually controllable means for moving said arm and pawl in one direction, and means including an escapement for moving the same step-by-step in the opposite direction, substantially as set forth.

28. A rotary member, a slidable pawl carried thereby, a series of toothed wheels into co-action wherewith said pawl may be slidably moved, means for manually moving said pawl in one direction, automatic means including an ascapement for moving the pawl in the opposite direction, and means for rotating said rotary member through a predetermined angle, substantially as set forth.

29. In a calculating machine, a shaft, a plurality of sectors mounted to oscillate thereon, means secured to said shaft for controlling the movement of said sectors, a movable window over said sectors, and means whereby rotation of said shaft also serves to impart longitudinal movement to said window, substantially as set forth.

30. In a calculating machine, a shaft, a plurality of oscillating sectors mounted side by side thereon, each sector having two columns of numerals on its outer face, means fixed on said shaft for controlling the movement of said sectors, movable means for covering the numerals in one column and exposing those in the other column, and means whereby rotation of said shaft produces longitudinal movement of said numeral covering means, substantially as set forth.

31. In a calculating machine, a shaft, a plurality of numeral carrying devices mounted for rotation thereon, means on said shaft for imparting rotation to said numeral carrying members, means fixed to said shaft for controlling the actuation of said numeral carrying devices, movable means for covering a part of said numerals and uncovering another part thereof, and means whereby upon rotation of said shaft the last-named means serves to cover the numerals previously exposed and expose others, substantially as set forth.

32. In a calculating machine, a shaft, a plurality of sectors mounted to oscillate thereon and comprising radial supporting arms, slidable members on said arms and including sidewise extending projections, a toothed wheel for each sector rotatably mounted on said shaft and each toothed wheel having a projection extending toward the corresponding sector, means fixed to said shaft for moving said slidable members toward and away from said shaft, a movable window over said sectors, and means whereby said window is moved endwise upon rotation of the shaft, substantially as set forth.

33. In a calculating machine, a shaft, a plurality of denominational units thereon, each unit comprising an indicating sector, a toothed wheel coacting therewith, and an intermediate cam, the sector and wheel turning on said shaft and the cam being fixed to said shaft, a movable window over said sectors, and means whereby rotation of said shaft and cams serves to impart longitudinal movement to said window, substantially as set forth.

34. In a calculating machine, a shaft, a sector on said shaft and carrying indicating numerals on its outer face, said sector comprising a radial arm having a hub by means of which it can turn freely on said shaft, a slide on said radial arm having a projecting nose on one side of said arm and an inwardly extending pawl on the other, a toothed wheel having sidewise projections extending toward the nose on said sector slide and mounted for rotation on said shaft, a cam fixed on said shaft for controlling the position of said slide on said arm, and a second toothed wheel on the opposite side of said sector and adapted to be advanced by means of said pawl upon movement of said slide, substantially as set forth.

35. In a calculating machine, a rotary member provided with pairs of complemental facets, means for moving said member longitudinally to present one or the other of the facets in each pair for actuation, a train of number wheels, means whereby rotation of said member is transferred to the wheel of said train, and means including a movable window for visually indicating numbers corresponding to the various degrees of rotation of each wheel of said train substantially as set forth.

36. In a calculating machine, a plurality of peripherally toothed coaxial denominational wheels, a frame pivoted coaxially of the wheels, a pawl slidable on said frame, key-controlled means for turning said pawl and the wheel opposite the pawl through a predetermined angle, and means for automatically moving said pawl on said frame to the position opposite the wheel of the next lower denomination, substantially as set forth.

37. In a calculating machine, a plurality of peripherally toothed coaxial denominational wheels, a frame pivoted coaxially of the wheels, a pawl slidable on said frame, key-controlled means for turning said frame through a predetermined angle, and means comprising an escapement for positioning the pawl on the frame opposite the respective wheels, substantially as set forth.

38. In a calculating machine, a plurality of peripherally toothed coaxial denominational wheels, a frame pivoted coaxially of the wheels, a pawl slidable on said frame, key-controlled means for turning said frame through various angles, and an escapement for sliding said pawl on said frame, substantially as set forth.

39. In a calculating machine, a plurality of peripherally toothed coaxial denominational wheels, a frame pivoted coaxially of the wheels, a pawl slidable on said frame, key-controlled means including a single rotary member for imparting rotation to said frame and the pawl carried thereby, and means including an escapement for sliding said pawl along said frame, substantially as set forth.

40. In a calculating machine, a plurality of peripherally toothed coaxial denominational wheels, a plurality of sectors bearing indicating numerals actuated from said wheels, a frame pivoted coaxially of said wheels, a pawl sliding in said frame, key-controlled means for turning said frame, and means releasable upon operation of the keys for sliding said pawl longitudinally on said frame, substantially as set forth.

41. In a calculating machine, a plurality of peripherally toothed coaxial denominational wheels, a hollow shaft on which the same are mounted, a second shaft in line therewith, and means whereby rotation of said second shaft is imparted selectively to said toothed wheels, a shaft extending through the hollow shaft into contact with said second shaft, and means for pushing the last-named shaft endwise within the hollow shaft and thereby imparting endwise movement to said second shaft, substantially as set forth.

42. In a calculating machine, a plurality of peripherally toothed coaxial denominational wheels, a frame pivoted coaxially of the wheels, a pawl sliding on said frame and comprising a yoke, an arm curved in the arc of a circle coaxial with said wheels and frame and received in the yoke of said pawl, key-controlled means for turning said frame on its axis, and means including an escapement for imparting sliding movement to said arcuate arm and moving the pawl longitudinally of the frame, substantially as set forth.

43. In a calculating machine, a hollow shaft, a plurality of peripherally toothed coaxial denominational wheels mounted to turn on said shaft, a second shaft in line therewith, devices under the control of the second shaft for rotating said wheels selectively, and means extending through said hollow shaft for imparting endwise movement to said second shaft, substantially as set forth.

44. In a calculating machine, a hollow shaft, a plurality of peripherally toothed wheels mounted to turn on said shaft, a frame pivoted to turn on said shaft and extending across the peripheries of said wheels, a pawl on the said frame, a second shaft in line with the hollow shaft and having pairs of actuating facets thereon, means of connection whereby rotation is imparted from said second shaft to said pawl, and means extending through said hollow shaft for moving said second shaft endwise and thereby moving one set of actuating facets out of and the other into operative position, substantially as set forth.

45. In a calculating machine, a shaft, a plurality of indicating sectors mounted to turn thereon, individual springs for retracting the sectors, a plurality of peripherally toothed wheels on said shaft, one for each sector, means whereby rotation of said peripherally toothed wheels in a forward direction turns said respective sectors forward, and means for releasing said sectors from the actuation of said wheels at specified points within the rotary movement thereof, substantially as set forth.

46. In a calculating machine, a hollow shaft, a plurality of peripherally toothed coaxial denominational wheels arranged thereon, a second endwise movable shaft in line with said hollow shaft, means for imparting rotary movement from said second shaft to said toothed wheels including a telescoping connection whereby rotation will be imparted irrespective of the position of said second-named shaft, and means in said hollow shaft for imparting endwise movement to said second shaft, substantially as set forth.

47. In a calculating machine, a hollow shaft, a plurality of peripherally toothed wheels thereon, a plurality of indicating sectors on said shaft and actuated by said wheels, means secured to said shaft for controlling the actuation of said sectors from said wheels, a second shaft in line with the hollow shaft and having a plurality of sets of complementary facets thereon, means extending through said hollow shaft for shifting said second shaft endwise to bring the complementary facets into operative position, and means for turning said hollow shaft and thereby changing the relative time of operation of said controlling means, substantially as set forth.

48. In a calculating machine, a plurality of peripherally toothed coaxial denominational wheels, a frame mounted to turn coaxially therewith, a pawl slidable on said frame before the said wheels, a shaft provided with a plurality of facets arranged at different angles through its length, means whereby rotation of said shaft is imparted to said frame, a plurality of key-controlled slide members for co-acting with the facets on the said shaft, and means including an escapement whereby the pawl is movable slidably on the frame at each action of the key-controlled means, substantially as set forth.

49. In a calculating machine, a plurality of peripherally toothed coaxial denominational wheels, a frame coaxial therewith, a pawl slidably carried thereby and comprising a yoke, an arcuate arm extending through said yoke, an escapement bar connected with said arm and having notches in its opposite faces, a slide bar arranged transversely thereof and provided with lugs at each face of said escapement bar, a plurality of keys, and means of connection whereby said pawl is rotated through a given angle upon operation of any key, and means of connection between said keys and said transverse bar whereby the same is moved longitudinally upon depression of a given key, substantially as set forth.

50. The combination with a series of coaxial wheels occupying different denominational positions, of a series of indicating sectors operated from said wheels, and means borne by said sectors for carrying from one denominational wheel to the wheel of next higher order, substantially as set forth.

51. The combination with a series of denominational members having zero stops thereon, of a series of indicating members actuated therefrom, spring means for moving said indicating members in reverse direction to that in which actuated by said denominational members, pawls for normally holding said denominational members against reverse movement but which may be turned to release the same, and stop-pieces coöperating with said zero stops for resetting said denominational members and sectors when said pawls are released, substantially as set forth.

52. The combination with a pair of coaxial denominational wheels, of an indicating member placed therebetween, said indicating member being provided with a longitudinally movable slide serving as a digit carrier, substantially as set forth.

53. The combination with a series of coaxial denominational wheels, of a combined numeral indicator and digit carrier placed between the said wheels and co-acting therewith, and means placed between each of said wheels and its adjacent indicator and digit carrier for controlling the co-action therebetween, substantially as set forth.

54. In a calculating machine, a series of peripherally toothed coaxial denominational wheels, a pawl for actuating said wheels selectively, means for imparting a step-by-step movement to said pawl comprising a bar notched at its opposite sides, a second bar extending transversely thereof and having lugs co-acting with said notches, spring means for moving said transverse bar in one direction, and key-controlled means for moving it in the opposite direction, substantially as set forth.

55. In a calculating machine, a series of peripherally toothed coaxial denominational wheels, a pawl arranged opposite said wheels and adapted to operate the same selectively, means for moving said pawl step-by-step in front of said wheels, and said means comprising an escapement, all the parts of which escapement are located in substantially the same horizontal plane and afford room thereabove for the placing of a typewriting machine upon the calculating machine, substantially as set forth.

56. In a calculating machine, a flat, low-down compartment containing the actuating mechanism and arranged to receive a typewriting machine thereon, a compartment containing the calculating and indicating mechanisms and arranged to extend beyond and at one side of a typewriter placed upon the first named compartment, an escapement extending across within the first named compartment, and means whereby the same may be operated from the number keys of the typewriting machine, substantially as set forth.

57. In combination, a series of denominational members, means for rotating said members selectively, means normally operating automatically for imparting movement of translation to said rotating means to present the same opposite the denominational member of next lower order, and automatic means for intermittently preventing the movement of translation of said rotating means, thereby enabling successive actuations of a denominational member to be made, substantially as set forth.

58. In combination, a series of denominational members, means acting normally to rotate one of said members and then to move automatically to a place opposite the denominational member of next lower order, and stop means interposable in the path of said last-named means and serving to prevent the movement to next lower order while not interfering with the rotary actuation of a denominational member, substantially as set forth.

59. In combination, a series of denominational members, a pawl for rotating the said members selectively, means normally acting automatically to give said pawl a movement of translation to present it before the denominational member of next lower order, and means acting alternately to prevent such movement of translation and to permit such movement to take place, substantially as set forth.

60. In combination, a series of denominational members, a series of keys and key levers, means including a pawl whereby said members are actuated selectively from said keys, an escapement operated by said keys and normally acting automatically on depression of a key to present said pawl to the denominational member of next lower order, and a stop-piece for preventing the advance of said escapement one step upon every other depression of a key, substantially as set forth.

61. In a calculating machine, a series of keys and key leveres, a series of rotary denominational members, a pawl actuated by said keys for rotating said denominational members selectively to an extent determined by the key selected, a master bar actuated from said key levers, an escapement actuated from the master bar and normally serving to advance said pawl on each depression of the master bar, and means adjustable in the path of a portion of the master bar for preventing such advance upon every alternate movement of the master bar, substantially as set forth.

62. In a calculating machine, a series of rotatable denominational members placed side by side, means for rotating said members, said means being movable across the series of members, means for moving said rotating means across the members in the series, and stop means for automatically stopping the return of said rotating means at the position opposite the denominational member lower in order by one on each return movement thereof, substantially as set forth.

63. In a calculating machine, a series of rotary denominational members, a pawl movable across the members in the series for rotating the same selectively, an escapement for moving said pawl across the members in the series in one direction, hand-actuable means for recharging said escapement, and means for successively stopping the escapement on recharge with the said pawl opposite the denominational member of next lower order than on the previous recharge, substantially as set forth.

64. In a calculating machine, a series of rotary denominational members, an escapement, means for rotating said members, said means being movable across the members in the series by said escapement, means for stopping the escapement on recharge with the rotating means opposite the denominational member of next lower order than on the previous recharge, means for preventing the normal step-by-step advance movement of the escapement from taking place on every other step, and common means for setting the two last-named means into operation, substantially as set forth.

65. The combination with a series of wheels occupying different denominational positions of a series of indicating sectors operated from said wheels, means operated by said sectors for carrying from one denominational wheel to the wheel of next higher order, normally stationary means for actuating said means, said normally stationary means being shiftable to cause the carrying operation to take place at a different stage in the movement of said denominational wheels, substantially as set forth.

66. In combination, a number wheel rotatable in one direction only, a member supported for oscillation adjacent to said wheel, means whereby rotation is imparted from said wheel to said member during a part of its rotation, normally stationary means located between the wheel and member for limiting the movement of said member under the action of said wheel and permitting said member to move in reverse direction to that of the wheel, and means for shifting the position of said normally stationary means, substantially as set forth.

67. In combination, a sector provided with indicating numerals on its outer face, and comprising a radial arm, a slide mounted for radial movement on said arm and provided with a projecting nose on one side and with a pawl on the other side of said arm, a normally stationary cam member in the path of said nose, and means for shifting the position of said normally stationary cam member, substantially as set forth.

68. In combination, an oscillatable indicating member, a slide movable radially thereon and provided with a projecting nose on one side and with a pawl on the other side, and normally stationary means having a cam surface co-acting with said nose, and means for shifting the position of said normally stationary means, substantially as set forth.

69. In combination, a sector, a toothed wheel, a normally stationary cam intermediate of the sector and the wheel, means on said wheel and sector whereby co-action between them may be secured, said cam being adapted to terminate the connection between the wheel and sector, and means for shifting said cam to terminate said connection at a different point in the movement of said wheel and sector, substantially as set forth.

70. In combination, a shaft, a sector mounted to oscillate thereon, a toothed wheel rotatable thereon, a cam fixed to said shaft between the sector and wheel and serving to bring said wheel and sector into and out of co-action with one another, and means for rotating said shaft to shift the position of said cam with respect to said wheel and sector, substantially as set forth.

71. In combination, a shaft, a toothed wheel on said shaft and having a sidewise projection thereon, a cam on said shaft, a sector free to oscillate on said shaft, a movable member on said sector and having thereon means for coöperating with said cam for controlling the position of said movable member with respect to said sector, and means for shifting the position of said cam with respect to said wheel and sector, substantially as set forth.

72. In combination, a shaft, a sector mounted for oscillation thereon, a radially slidable sidewise projecting member on said sector, a wheel rotatable on said shaft and having a fixed projection extending sidewise toward said sector, a cam between said sector and wheel and fixed to said shaft for moving said slidable member into and out of contact with said projection of said wheel, and means for imparting limited rotation to said shaft and sector, substantially as set forth.

73. In combination, a movable indicating member, a movable denominational member, relatively movable means whereby movement is imparted from one of said members to the other, and means between said members for imparting movement to the first named means, substantially as set forth.

74. In combination, a movable indicating member, a movable denominational member adjacent thereto, movable means on one of said members whereby movement is imparted from said denominational member to said indicating member, normally stationary means between said members for imparting movement to said first named means, and means for changing the position of said normally stationary means, substantially as set forth.

75. A series of movable denominational members, carrying means therefor, digit actuating means, means whereby upon operation of the actuating means the complementary digits are set up on the denominational members, and means for shifting the acting position of the carrying members whereby in setting up additional digits the carrying operation takes place at a changed position, substantially as set forth.

76. A series of movable denominational members, means for carrying from one to another normally operative when a denominational member has passed through nine intervals of movement, and means for shifting the carrying members so that they operate when such denominational member has passed through an additional interval, substantially as set forth.

77. A series of rotary number wheels, means for carrying from one to another normally operative when a wheel of lower denomination has passed through nine intervals of rotation, and means for retarding the action of the carrying means so that they operate when such lower denominational member has passed through an additional interval, substantially as set forth.

78. A series of movable denominational members, actuating means corresponding to digits, means whereby the members are moved in one direction only from action of the actuating means, means whereby carrying is normally effected from a lower to the next higher denominational member when the former has passed through a given number of digit intervals, and means for causing said carrying means to operate at a different stage in the movement of the denominational members, substantially as set forth.

79. A series of movable denominational members, actuating means corresponding to digits, means including an escapement whereby upon movement of said actuating means said members are moved one after another in descending denominational order, means whereby carrying is normally effected from a lower to the next higher denominational member when the former has passed through a given number of digit intervals, and means for causing said carrying means to operate at a different stage in the movement of said denominational members, substantially as set forth.

80. A series of movable denominational members upon which digits may be set up, digit actuating means, means whereby the complements of the digits of a number struck may be set up on said members, carrying means, and means whereby the position at which the carrying means are operative is changed in setting up a subsequent number, substantially as set forth.

81. In a calculating machine, a series of denominational members, carrying means, digit actuating means, means for setting up on the denominational members the complements of the digits of a number struck, and means interconnected with the last named means for changing the place of operation of the carrying devices, substantially as set forth.

82. In a calculating machine, a series of denominational members, means for carrying from one member to the next higher in the series, and means for shifting the position of the carrying means, substantially as set forth.

83. In a calculating machine, a series of movable denominational members, means for carrying from one of said members to the next higher in the series, and means to vary the region of operation of said carrying means, substantially as set forth.

84. In a calculating machine, a series of denominational members, carrying means, digit actuating members, means whereby the complements of digits struck are set up on said denominational members, and means for shifting the place of operation of said carrying means, substantially as set forth.

85. In a calculating machine, a series of denominational members, carrying means therefor having one position for addition, and means for shifting the carrying means to a different position for performing the operation of subtraction, substantially as set forth.

86. In a calculating machine, a series of denominational members, number keys, and a skip-step escapement whereby after a key has been struck and its digit set up on a denominational member the following digit struck on a key is set up on the same denominational member, substantially as set forth.

87. A series of movable denominational members, digit actuating devices, means whereby when said devices are actuated the members may be moved, said means including a skip-step escapement whereby the same denominational member may be moved twice in succession, substantially as set forth.

88. In a calculating machine, an accumulator having a series of total wheels, a traveling carriage movable step by step to provide for the transmission of movement to the total wheels of different order, keys and key controlled devices for actuating said total wheels, and a key controlled carriage moving device including means for advancing said carriage only one step in response to two key operations.

89. In a calculating machine, an accumulator having a series of total wheels, a traveling carriage movable step by step to provide for the transmission of movement to the total wheels of different order, keys and key controlled devices for actuating said total wheels, and a key controlled escapement device for moving said carriage, said escapement device being provided with a carriage holding member for holding said carriage during alternate key operations and also with a carriage releasing device which allows the carriage to advance only one step in response to two key operations.

90. In a calculating machine, an accumulator having total wheels, a traveling carriage movable step by step to provide for the transmission of movement to the different total wheels, keys and key controlled devices for actuating said total wheels, and a key controlled carriage moving device provided with means for retaining said carriage in a fixed position during two consecutive key operations so as to provide for the consecutive addition of two numbers of the same order, and said key controlled carriage moving device being provided with means for advancing the carriage one step in response to two consecutive key operations.

91. In a calculating machine, an accumulator having total wheels, a traveling carriage movable step by step to provide for the transmission of movement to the different total wheels, keys and key controlled devices for actuating said total wheels, and a key controlled escapement device for advancing said carriage, said escapement device being provided with a retaining dog for holding said carriage in a fixed position during two consecutive key operations so as to provide for the consecutive addition of two numbers of the same order, and said key controlled escapement device being also provided with releasing means for releasing said retaining dog in response to two consecutive key operations.

92. In a calculating machine, an accumulator having total wheels, a traveling carriage movable step by step to provide for the transmission of movement to the different total wheels, keys and key controlled devices for actuating said total wheels, the key controlled escapement device being adapted to advance said carriage one step in response to each key operation, and a multiplying attachment associated with said escapement device so as to render the latter ineffective during alternate key operations, said escapement device being provided with a dog for holding said carriage in a fixed position, and said multiplying attachment being provided with means for releasing said dog in response to two consecutive key operations so as to provide for the consecutive addition of two numbers of the same order.

In testimony that I claim the foregoing, I have hereto set my hand this 6th day of March, 1914.

AUGUSTUS BONTEMPI.

Witnesses:
M. A. JOHNSON,
H. TRANTVETTER.

Copies of this patent may be obtained for five cents each, by addressing the "Commissioner of Patents, Washington, D. C."